United States Patent
Park

(10) Patent No.: US 10,749,366 B2
(45) Date of Patent: Aug. 18, 2020

(54) WIRELESS POWER RECEIVER AND WIRELESS POWER TRANSMITTER

(71) Applicant: Samsung Electronics Co., Ltd., Suwon-si (KR)

(72) Inventor: Han-Seok Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 482 days.

(21) Appl. No.: 15/230,605

(22) Filed: Aug. 8, 2016

(65) Prior Publication Data
US 2017/0077738 A1    Mar. 16, 2017

(30) Foreign Application Priority Data
Sep. 11, 2015 (KR) .................. 10-2015-0129161

(51) Int. Cl.
| H02J 7/00 | (2006.01) |
| H02J 7/02 | (2016.01) |
| H02J 50/12 | (2016.01) |
| H02J 50/80 | (2016.01) |
| H02J 50/40 | (2016.01) |
| H01F 27/36 | (2006.01) |
| H02J 50/70 | (2016.01) |
| H01F 38/14 | (2006.01) |

(52) U.S. Cl.
CPC .............. *H02J 7/025* (2013.01); *H01F 27/36* (2013.01); *H02J 50/12* (2016.02); *H02J 50/40* (2016.02); *H02J 50/80* (2016.02); *H01F 38/14* (2013.01); *H02J 50/70* (2016.02)

(58) Field of Classification Search
CPC .. H02J 50/50; H02J 50/60; H02J 50/70; H02J 50/80; H02J 50/90

USPC .......................................... 320/108; 307/104
See application file for complete search history.

(56) References Cited

U.S. PATENT DOCUMENTS

| 8,159,090 B2 * | 4/2012 | Greene ................... H02J 17/00 307/104 |
| 8,947,186 B2 | 2/2015 | Kurs et al. |

(Continued)

FOREIGN PATENT DOCUMENTS

| JP | 2008-301645 A | 12/2008 |
| JP | 2010-503368 A | 1/2010 |

(Continued)

OTHER PUBLICATIONS

Int'l Search Report and Written Opinion for PCT/KR2016/009983 dated Dec. 9, 2016.
Communication dated Oct. 18, 2018 issued by the European Patent Office in counterpart European Application No. 16844661.5.

(Continued)

*Primary Examiner* — Zixuan Zhou
(74) *Attorney, Agent, or Firm* — Sughrue Mion, PLLC

(57) ABSTRACT

Disclosed is a wireless power receiver for receiving power wirelessly. According to an embodiment of the present disclosure, a wireless power receiver wirelessly receiving power may include a first power receiver receiving first power from a first power transmitter, a second power receiver receiving second power from a second power transmitter, and a shielder disposed between the first power receiver and the second power receiver to substantially shield influx of the first power into the second power receiver and to substantially shield influx of the second power into the first power receiver.

12 Claims, 25 Drawing Sheets

(56) References Cited

U.S. PATENT DOCUMENTS

| | | |
|---|---|---|
| 2008/0054638 A1 | 3/2008 | Greene et al. |
| 2008/0298100 A1* | 12/2008 | Esaka .................. H01F 38/14 |
| | | 363/67 |
| 2009/0072784 A1 | 3/2009 | Erickson |
| 2011/0018360 A1 | 1/2011 | Baarman et al. |
| 2012/0001590 A1 | 1/2012 | Yeh |
| 2013/0043734 A1* | 2/2013 | Stone .................. H02J 50/40 |
| | | 307/104 |
| 2013/0181535 A1 | 7/2013 | Muratov et al. |
| 2013/0257366 A1 | 10/2013 | Scholz et al. |
| 2013/0281160 A1 | 10/2013 | Han et al. |
| 2014/0239729 A1* | 8/2014 | Covic .................. G01R 31/28 |
| | | 307/104 |
| 2014/0375258 A1 | 12/2014 | Arkhipenkov et al. |
| 2015/0022020 A1* | 1/2015 | Borngraber .......... H02J 5/005 |
| | | 307/104 |
| 2015/0084431 A1 | 3/2015 | Yeh |
| 2015/0097442 A1 | 4/2015 | Muurinen |
| 2015/0178526 A1* | 6/2015 | Roh .................... H01Q 7/00 |
| | | 235/439 |
| 2017/0317533 A1 | 11/2017 | Byrne et al. |

FOREIGN PATENT DOCUMENTS

| | | |
|---|---|---|
| JP | 2015-163009 A | 9/2015 |
| KR | 10-2012-00827 A | 7/2012 |
| KR | 10-2014-0065411 A | 5/2014 |
| KR | 2014-0060186 A | 5/2014 |
| KR | 10-2014-0147650 A | 12/2014 |
| WO | 2013/107920 A1 | 7/2013 |

OTHER PUBLICATIONS

Communication dated Feb. 21, 2019, issued by the European Patent Office in counterpart European Application No. 16844661.5.

Communication dated May 15, 2020 issued by the Korean Intellectual Property Office in counterpart Korean Application No. 10-2015-0129161.

* cited by examiner

WIRELESS POWER RECEIVER AND WIRELESS POWER TRANSMITTER

RELATED APPLICATION(S)

This application claims the benefit under 35 U.S.C. § 119(a) of a Korean patent application filed in the Korean Intellectual Property Office on Sep. 11, 2015 and assigned Serial No. 10-2015-0129161, the entire disclosure of which is incorporated herein by reference.

BACKGROUND

The present disclosure relates to power charging, and more specifically, to wireless power receivers that wirelessly receive power from wireless power transmitters and wireless power transmitters that wirelessly transmit power to wireless power receivers.

A mobile terminal, such as a portable phone or a PDA (Personal Digital Assistant), uses rechargeable battery. In order to charge such a battery, electric energy is supplied by a separate charging device that plugs into the mobile device, or otherwise mates the contact terminals of the mobile device to contact terminals of the charging device. However, this type of charging method exposes the contact terminals on the mobile device and/or the charging device to the environment. Accordingly, the contact terminals may get contaminated by foreign matter, thereby interfering with charging the battery. Additionally, the exposed contact terminals on the mobile device may make it harder to make the mobile device water resistant.

Wireless charging, or contactless charging, technology has been developed and used for a number of electronic devices. Such wireless charging technology uses wireless power transmission and reception. The wireless charging technology allows a battery to be charged by merely putting a mobile device, such as a cell phone, on a charging pad without connecting the portable phone to a separate charging device. Wireless charging technology is used for many devices currently, including for wireless electric toothbrushes and wireless electric shavers. It is expected that wireless charging technology will advance significantly as electric cars become more common.

Presently, wireless charging technology main interest is with the inductive coupling method (inductive method), the resonance inductive coupling method (resonance method), and the RF/microwave radiation method. When power is transferred by the inductive coupling method, referred to in this disclosure as the inductive method, current in a primary coil generates a magnetic field, and that magnetic field induces current in a secondary coil. Power transmission using inductive coupling has excellent energy transmission efficiency. However, the primary and secondary coils must be very close to each other for efficient energy transfer. Coils may also be referred to as inductors.

The resonance inductive coupling method, referred to in this disclosure as the resonance method, is a type of inductive coupling method where both the transmitter and the receiver have circuits tuned to a specific frequency. Professor Soljacic at MIT demonstrated this wireless charging system in 2005 by transferring power to an electronic device several meters away using Coupled Mode Theory. The resonance method uses the concept of resonance frequency, where resonance frequency is a characteristic of all objects. An object may preferentially generate or receive energy at its resonance frequency. For example, when a tuning fork is struck, it will vibrate at its resonance frequency. A wine glass near the turning fork with the same resonance frequency will absorb the acoustic energy of the vibrations generated by the tuning fork until the wine glass shatters. Similarly, a power transmitter using the resonance method generates a magnetic field of a specific frequency. Energy is efficiently transferred via that magnetic field when there is a receiving device with receiving circuitry that has that resonance frequency. Due to larger distances between the transmitting device and the receiving device, the resonance method may have lower energy transmission efficiency than the inductive method.

In some cases wireless charging may provide increased charging efficiency over outlet charging. Various techniques are being researched to further raise the charging efficiency. Merely increasing power from the wireless power transmitter may lead to a sharp heat build-up in the wireless power receiver due to larger electric current in the coils or capacitors.

The above information is presented as background information only to assist with an understanding of the present disclosure. No determination has been made, and no assertion is made, as to whether any of the above might be applicable as prior art with regard to the present disclosure.

SUMMARY

According to an embodiment of the present disclosure, there is provided a wireless power receiver having multiple power receivers. According to an embodiment of the present disclosure there is also provided a wireless power transmitter transmitting power to a wireless power receiver having a plurality of power receivers.

According to an embodiment of the present disclosure, a wireless power receiver may include a first power receiver configured to receive first power from a first power transmitter, a second power receiver configured to receive second power from a second power transmitter, and a shielder disposed between the first power receiver and the second power receiver to substantially shield influx of the first power to the second power receiver and substantially shield influx of the second power to the first power receiver.

According to an embodiment of the present disclosure, a wireless power transmitter may comprise a first flat plate and a second flat plate spaced apart from the first flat plate at a first interval. The first space between the first flat plate and the second flat plate may accept a wireless power receiver, and the first flat plate may include a first power transmitter configured to transmit first power to a first power receiver in the wireless power receiver, and the second flat plate may include a second power transmitter configured to transmit second power to a second power receiver in the wireless power receiver.

According to an embodiment of the present disclosure, a wireless power receiving module detachably provided to a wireless power receiver may comprise a first power receiver configured to receive first power from a first power transmitter and an interface configured to provide the received first power to the wireless power receiver. The wireless power receiver may be configured to receive second power from a second power transmitter via a second power receiver.

According to an embodiment of the present disclosure, a wireless power receiver wirelessly receiving power may comprise a first power receiver configured to receive first power from a first power transmitter and a second power receiver configured to receive second power from a second power transmitter. The first power receiver may be disposed to substantially inhibit influx of the second power, and the second power receiver is disposed to substantially inhibit influx of the first power.

Other aspects, advantages, and salient features of the disclosure will become apparent to those skilled in the art from the following detailed description, which, taken in conjunction with the accompanying drawings, discloses exemplary embodiments of the disclosure.

BRIEF DESCRIPTION OF THE DRAWINGS

A more complete appreciation of the present disclosure and many of the attendant aspects thereof will be readily obtained with reference to the following detailed description when considered in connection with the accompanying drawings, wherein.

Throughout the drawings, like reference numerals will be understood to refer to like parts, components, and structures.

DETAILED DESCRIPTION

Figure 1:
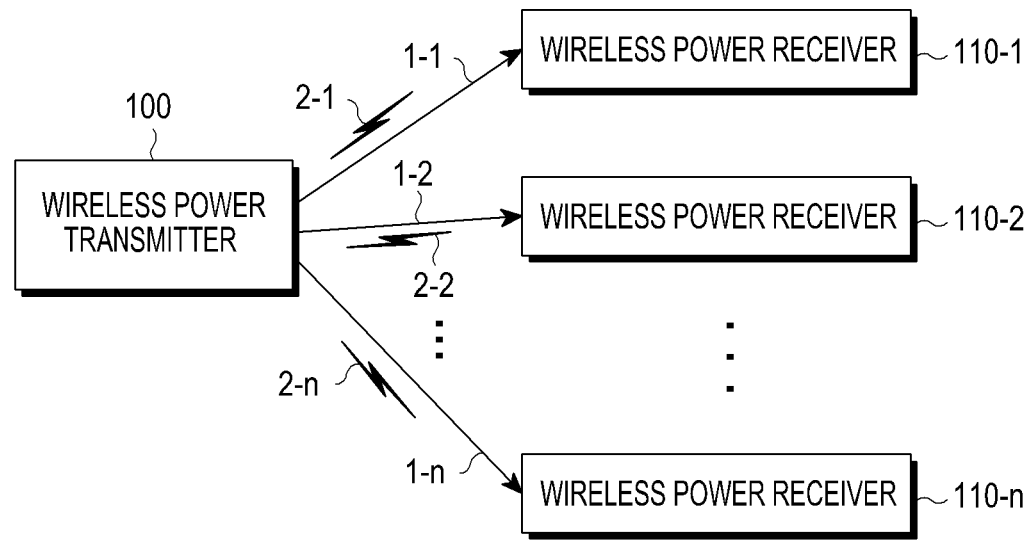
FIG. 1 is a view illustrating the overall operation of a wireless charging system.

Various embodiments of the present disclosure will be described with reference to the accompanying drawings. However, it should be understood that there is no intent to limit the present disclosure to the particular forms disclosed herein. Rather, the present disclosure should be construed to cover various modifications, equivalents, and/or alternatives of embodiments of the present disclosure. In describing the drawings similar reference numerals may be used to designate similar elements.

An expression such as "comprising," or "may comprise" may be used in the present disclosure to indicate existence of a corresponding function, operation, or component, and does not exclude existence of additional functions, operations, or components. In the present disclosure, the terms "comprising," "having," and "including" indicates a characteristic, a number, a step, a component, a part, a part, or a combination thereof, and should not be construed as excluding existence or a possibility of addition of one or more other characteristics, numbers, steps, operations, components, parts, or combinations thereof.

In the present disclosure, an expression such as "A and/or B," "at least one of A and B," or "one or more of A and B" may include all possible combinations of together listed items. For example, "A and/or B," "at least one of A and B," or "one or more of A and B" may include (1) at least one A, (2) at least one B, or (3) both at least one A and at least one B.

Expressions such as "first," "second," "primary," or "secondary" used in descriptions of various exemplary embodiments may represent various elements regardless of order and/or importance and do not necessarily indicate relative importance of or specific order of corresponding elements. The expressions may be used for distinguishing one element from another element. For example, a first user device and a second user device may represent different user devices without regard to order or importance. Accordingly, a first element may be referred to as a second element without deviating from the scope of the present disclosure, and similarly, a second element may be referred to as a first element.

When it is described that a first element is "operatively or communicatively coupled" or "connected" to a second element, the first element can be directly connected to the second element or it can be connected to the second element through a third element. However, when it is described that a first element is "directly connected" or "directly coupled" to a second element, it means that there is no intermediate element (such as a third element) between the first element and the second element.

The expression "configured to" used in the present disclosure may be replaced with, for example, "set to," "suitable for," "having the capacity to," "designed to," "adapted to," "made to," or "capable of" according to a situation. The expression "configured to" does not necessarily mean "specifically designed to" do a function by hardware. Alternatively, in some situation, an expression "apparatus configured to" may mean that the apparatus can operate together with another apparatus or component. For example, the phrase "a processor configured to perform A, B, and C" may refer to a generic-purpose processor (such as a CPU or an application processor) that can perform a corresponding operation by executing at least one software program stored at a memory device or an exclusive processor (such as an embedded processor) for performing a corresponding operation.

Terms defined in the present disclosure are used only for describing a specific exemplary embodiment and does not necessarily limit the scope of other exemplary embodiments. When used in the present disclosure and the appended claims, a singular form may also encompass the plural form unless it is explicitly stated otherwise. All terms including technical terms and scientific terms used here may have the same meaning as generally understood by a person of ordinary skill in the art. Terms defined in a dictionary have the same meaning as or a meaning similar to that of a context of related technology and should not be analyzed to have an ideal or excessively formal meaning unless explicitly defined as such. Terms defined in the present disclosure should not be analyzed to exclude the present exemplary embodiments.

A wireless power transmitter and/or a wireless power receiver, according to various embodiments of the present disclosure, may be included in various electronic devices. For example, the electronic device may include at least one of a smartphone, a tablet personal computer (tablet PC), a mobile phone, a video phone, an electronic book (e-book) reader, a desktop PC, a laptop PC, a netbook computer, a personal digital assistant (PDA), a portable multimedia player (PMP), an MP3 player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smart watch).

Now described is the concept of wireless charging system that may apply to embodiments of the present disclosure with reference to FIG. 1.

FIG. 1 is a view illustrating the overall operation of a wireless charging system. Referring to FIG. 1, the wireless charging system includes a wireless power transmitter 100 and at least one wireless power receiver 110-1, 110-2, . . . and 110-n.

The wireless power transmitter 100 may transmit powers 1-1, 1-2, . . . , 1-n to the one or more wireless power receivers 110-1, 110-2, . . . , 110-n, respectively. More specifically, the wireless power transmitter 100 may transmit powers 1-1, 1-2, . . . , 1-n only to those wireless power receivers 110-1, 110-2, . . . , 110-n that have been authenticated through a predetermined authentication procedure. The wireless power transmitter 100 may transmit wireless power based on, for example, the inductive method or the resonance method.

The wireless power transmitter 100 may conduct bidirectional communication with the wireless power receivers 110-1, 110-2, . . . , 110-n. The wireless power transmitter 100 and the wireless power receivers 110-1, 110-2, . . . , 110-n may use packets 2-1, 2-2, . . . , 2-n, respectively, for communication, where the packets may be configured as frames at lower network levels. The wireless power receiver may be, for example, a mobile terminal such as, for example, a PDA, a PMP, a smartphone, etc.

The wireless power transmitter 100 may provide power to the plurality of wireless power receivers 110-1, 110-2, . . . , 110-n in a wireless manner. For example, the wireless power transmitter 100 may transmit power to the plurality of wireless power receivers 110-1, 110-2, . . . , 110-n through the resonance method. When the wireless power transmitter 100 uses the resonance method, the distance between the wireless power transmitter 100 and the plurality of wireless power receivers 110-1, 110-2, . . . , 1110-n may be, for example, 30 m or less. When the wireless power transmitter 100 uses the inductive method, the distance between the wireless power transmitter 100 and the plurality of wireless power receivers 110-1, 110-2, . . . , 110-n may be, for example, 10 cm or less.

Each of the wireless power receivers 110-1, 110-2, . . . , and 110-n may charge its associated battery by receiving the wireless power from the wireless power transmitter 100. In addition, each of the wireless power receivers 110-1, 110-2, . . . , 110-n may transmit a signal for requesting wireless power transmission, information needed for receiving wireless power, wireless power receiver state information, wireless power transmitter 100 control information, or the like to the wireless power transmitter 100.

In addition, each of the wireless power receiver 110-1, 110-2, . . . , and 110-n may transmit a message indicating the charge state of its associated battery to the wireless power transmitter 100.

The wireless power transmitter 100 may include, for example, a display that can indicate the state of each of the wireless power receivers 110-1, 110-2, . . . , 110-n based on massages received from the wireless power receivers 110-1, 110-2, . . . , 110-n. The wireless power transmitter 100 may also be able to indicate an expected time until the charging of each of the wireless power receivers 110-1, 110-2, . . . , 110-n is completed, as appropriate.

The wireless power transmitter 100 may also transmit control signals to each of the wireless power receivers 110-1, 110-2, . . . , 110-n to disable its respective wireless charging function. A wireless power receiver that has received the control signal to disable its wireless charging function may then proceed to disable its wireless charging function.

Figure 2:
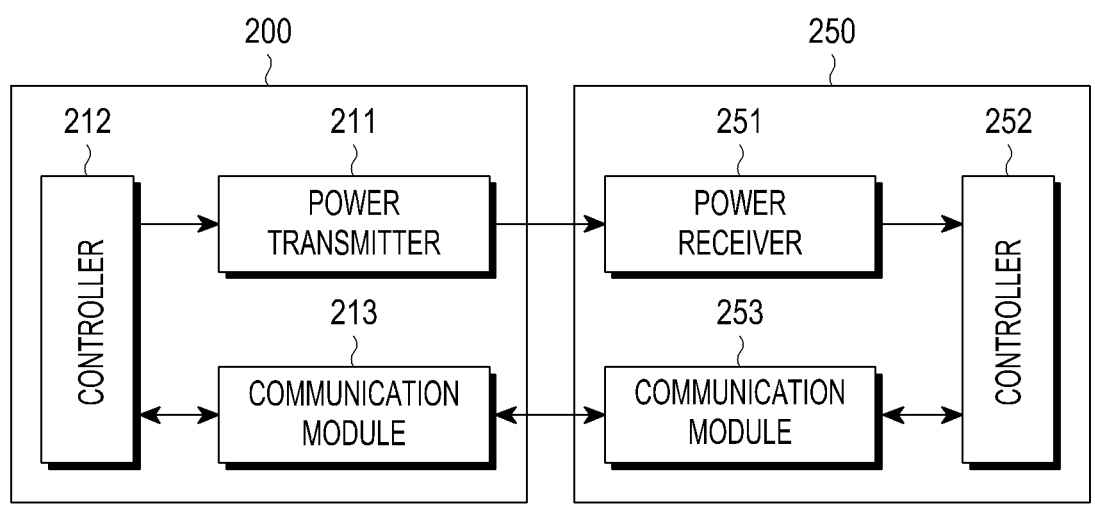
FIG. 2 is a block diagram illustrating a wireless power transmitter and a wireless power receiver according to an embodiment of the present disclosure.

FIG. 2 is a block diagram illustrating a wireless power transmitter and a wireless power receiver according to an embodiment of the present disclosure.

Referring to FIG. 2, the wireless power transmitter 200 may include a power transmitter 211, a controller 212, and a communication module 213. The wireless power receiver 250 may include a power receiver 251, a controller 252, and a communication module 253.

The power transmitter 211 may provide power required by the wireless power transmitter 200 and may provide wireless power to the wireless power receiver 250. The power transmitter 211 may supply alternating current (AC) power, and may also supply AC power that has been converted from direct current (DC) power using an inverter. The power transmitter 211 may be implemented in the form of an embedded battery or in the form of a power receiving interface so that it receives power from the outside and supplies it to other components. Those skilled in the art will readily understand that the power transmitter 211 is not limited as long as the power transmitter 211 is capable of providing AC power according to specifications for one or more embodiments of the present disclosure.

In addition, the power transmitter 211 may transmit AC power to the wireless power receiver 250. The power transmitter 211 may further include a resonant circuit or an inductive circuit for transmitting and receiving specified electromagnetic waves. When the power transmitter 211 is implemented with a resonant circuit, an inductance L of a loop coil of the resonant circuit may be changed. Those skilled in the art will readily understand that the power transmitter 211 is not limited as long as the power transmitter 211 is capable of transmitting and receiving electromagnetic waves.

The controller 212 may control the overall operation of the wireless power transmitter 200. The controller 212 or the controller 252 may control the overall operation of the wireless power transmitter 200 by executing an algorithm, program, or application read from a storage unit (not shown). The controller 212 may be implemented in the form of a central processing unit (CPU) such as, for example, a microprocessor. The controller 252 may control the overall operation of the wireless power transmitter 200.

The communication module 213 may communicate with the wireless power receiver 250 via a predetermined scheme. The communication module 213 may communicate with the communication module 253 of the wireless power receiver 250 via, e.g., near field communication (NFC), ZigBee communication, infrared (IR) communication, visible light communication, Bluetooth communication, Bluetooth low energy (BLE) communication, etc. The communication module 213 may use a carrier sense multiple access/collision avoidance (CSMA/CA) algorithm. The above-enumerated communication schemes are merely an example, and embodiments of the present disclosure are not limited to a particular communication scheme performed by the communication module 213.

The communication module 213 may transmit information about the wireless power transmitter 200. The communication module 213 may unicast, multicast or broadcast the information. The communication module 213 may receive power information from the wireless power receiver 250. The power information may include at least one of the battery capacity, the remaining battery level, the number of charging, the usage, of the wireless power receiver 250.

The communication module 213 may transmit a charging function control signal to control the charging function of the wireless power receiver 250. The charging function control signal may be a control signal that enables or disables the charging function by controlling the power receiver 251 of a particular wireless power receiver 250. The communication module 213 may receive signals from other wireless power transmitters (not shown) as well as from the wireless power receiver 250.

The wireless power transmitter 200 and the wireless power receiver 250 may communicate with each other to allow the wireless power receiver 250 to join the wireless power network controlled by the wireless power transmitter 200. The power receiver 251 may receive wireless power from the power transmitter 211 based on the inductive method or the resonance method.

FIGS. 3A to 3D are block diagrams illustrating wireless power receivers according to embodiments of the present disclosure.

Figure 3A:
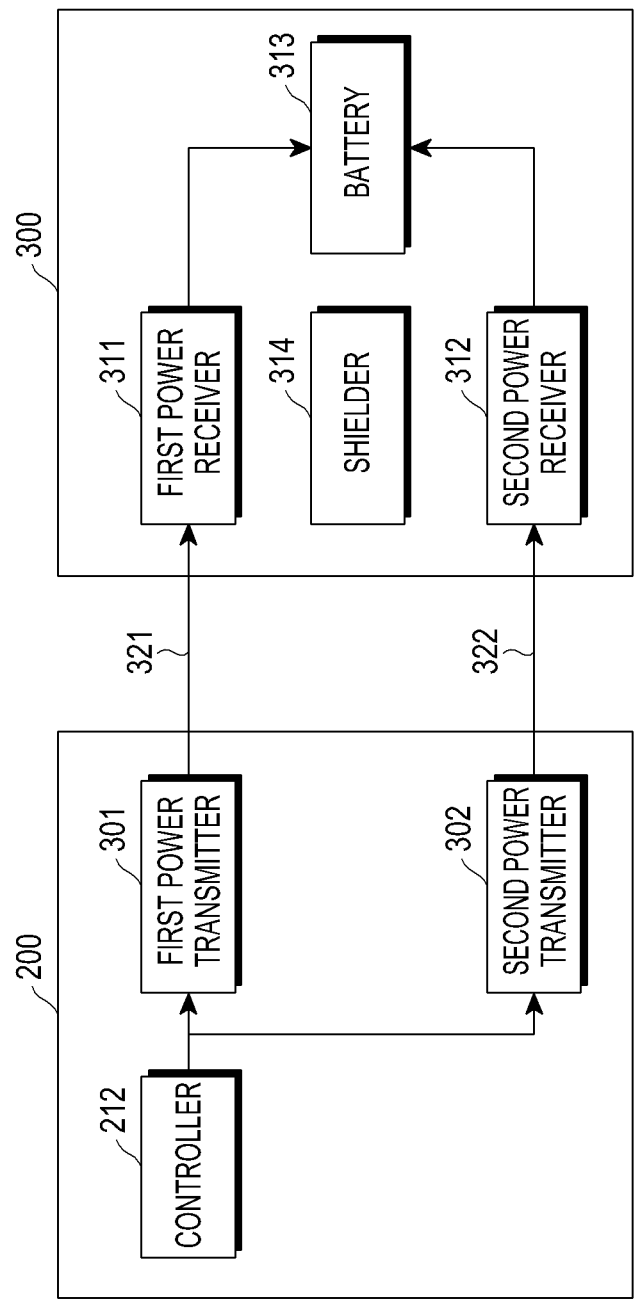
FIGS. 3A to 3D are block diagrams illustrating wireless power receivers according to embodiments of the present disclosure.

Referring to FIG. 3A, the wireless power transmitter 200 may include a controller 212, a first power transmitter 301, and a second power transmitter 302. The wireless power receiver 300 may include a first power receiver 311, a second power receiver 312, a battery 313, and a shielder 314.

The first power receiver 311 may receive first power 321 from the first power transmitter 301. The second power receiver 312 may receive second power 322 from the second power transmitter 302. Although the way that the first power receiver 311 receives the first power 321 from the first power transmitter 301 may be the same as the way that the second power receiver 312 receives the second power 322 from the second power transmitter 302, they may differ from each other in another embodiment. For example, the first power receiver 311 and the second power receiver 312 both may receive power based on a resonance method standard such as the Alliance for Wireless Power (A4WP) standard, or the first power receiver 311 may receive the first power 321 based on the resonance method while the second power receiver 312 may receive the second power 322 based on the inductive method.

According to an embodiment of the present disclosure, the first power receiver 311 may receive the first power 321 of amount A, and the second power receiver 312 may receive the second power of amount B. Accordingly, as the first power receiver 311 and the second power receiver 312 simultaneously receive the first power 321 and the second power 322, the wireless power receiver 300 may receive power of amount A+B. The battery 313 in the wireless power receiver 300 may be quickly charged as it receives power of a relatively large magnitude. In particular, as only the first power 321 comes into the first power receiver 311, and only the second power 322 comes into the second power receiver 312, the first power receiver 311 or the second power receiver 312 may be prevented from trying to put out too much power that may cause a deterioration of a power receiver or damage from over-heating.

The shielder 314 may be disposed between the first power receiver 311 and the second power receiver 312. The shielder 314 may block the inflow of the second power 322 to the first power receiver 311 and the inflow of the first power 321 to the second power receiver 312. As the second power 322 is blocked from coming into the first power receiver 311, the first power 321 from the first power transmitter 301 may flow into the first power receiver 311. As the first power 321 is blocked from coming into the second power receiver 312, the second power 322 from the second power transmitter 302 may flow into the second power receiver 312. Thus, any one of the first power receiver 311 and the second power receiver 312 may be prevented from receiving too much power. That is, the first power receiver 311 may be electromagnetically isolated from the second power receiver 312.

The battery 313 may receive power from the first power receiver 311 and the second power receiver 312. The battery 313 may be charged and embedded or detachably included in the wireless power receiver 300. For example, the battery 313 may be embedded in the wireless power receiver 300 or may be formed to have a structure that may be removed from the wireless power receiver 300. Although in FIG. 3A, power is provided to the battery 313 from the first power receiver 311 and the second power receiver 312, power from the first power receiver 311 and the second power receiver 312 may be directly provided to other hardware components or externally to the wireless power receiver 300 according to an embodiment of the present disclosure. The battery 313 may simultaneously receive power from the first power receiver 311 and the second power receiver 312 and, thus may be quickly charged as compared with when it is supplied power from only one power receiver.

According to an embodiment of the present disclosure, the wireless power transmitter 200 may provide a wireless power network to each of the first power transmitter 301 and the second power transmitter 302. Specifically, the wireless power transmitter 200 may set the first power transmitter 301 as a master node that may be in charge of a wireless power network and may set the second power transmitter 302 as a master node that may be in charge of another wireless power network. Accordingly, the wireless power transmitter 200 may include a communication module (not shown) corresponding to the first power transmitter 301 and may include another communication module (not shown) corresponding to the second power transmitter 302.

In such a case, the wireless power receiver 300 may also include a communication module (not shown) corresponding to the first power receiver 311 and may include a communication module (not shown) corresponding to the second power receiver 312. The wireless power receiver 300 and the wireless power transmitter 200 may communicate with each other for wireless charging. For example, under the A4WP standard, the wireless power receiver 300 and the wireless power transmitter 200 may perform search, subscription, or charging initiation for wireless charging based on the Bluetooth low energy (BLE) scheme. In such case, the communication module (not shown) corresponding to the first power transmitter 301 may pair and communicate with the communication module (not shown) corresponding to the first power receiver 311, and the communication module (not shown) corresponding to the second power transmitter 302 may pair and communicate with the communication module (not shown) corresponding to the second power receiver 312. That is, the first power receiver 311 and the second power receiver 312 may independently perform communication for wireless charging with the first power transmitter 301 and the second power transmitter 302, respectively. Furthermore, the first power transmitter 301 and the second power transmitter 302 of the wireless power transmitter 200 may each operate as a master node that is in charge of a wireless charging network.

According to an embodiment of the present disclosure, the wireless power transmitter 200 may include one communication module for wireless charging. That is, the wireless power transmitter 200 may allocate only one master node in charge of a wireless charging network. In such a case, the wireless power receiver 300 may also include one communication module for wireless charging, and the communication module of the wireless power receiver 300 may perform communication for wireless charging with the communication module of the wireless power transmitter 200. Specifically, the communication module of the wireless power receiver 300 may form pairing with the communication module of the wireless power transmitter 200 and may communicate communication signals for wireless charging. The wireless power transmitter 200 may apply power to the first power transmitter 301 and the second power transmitter 302 based on a result of the communication.

As set forth above, there may be provided a wireless power receiver that enables quicker, stable, and high-efficiency charging while preventing the elements of any one power receiver from being over-powered or over-heated.

Figure 3B:
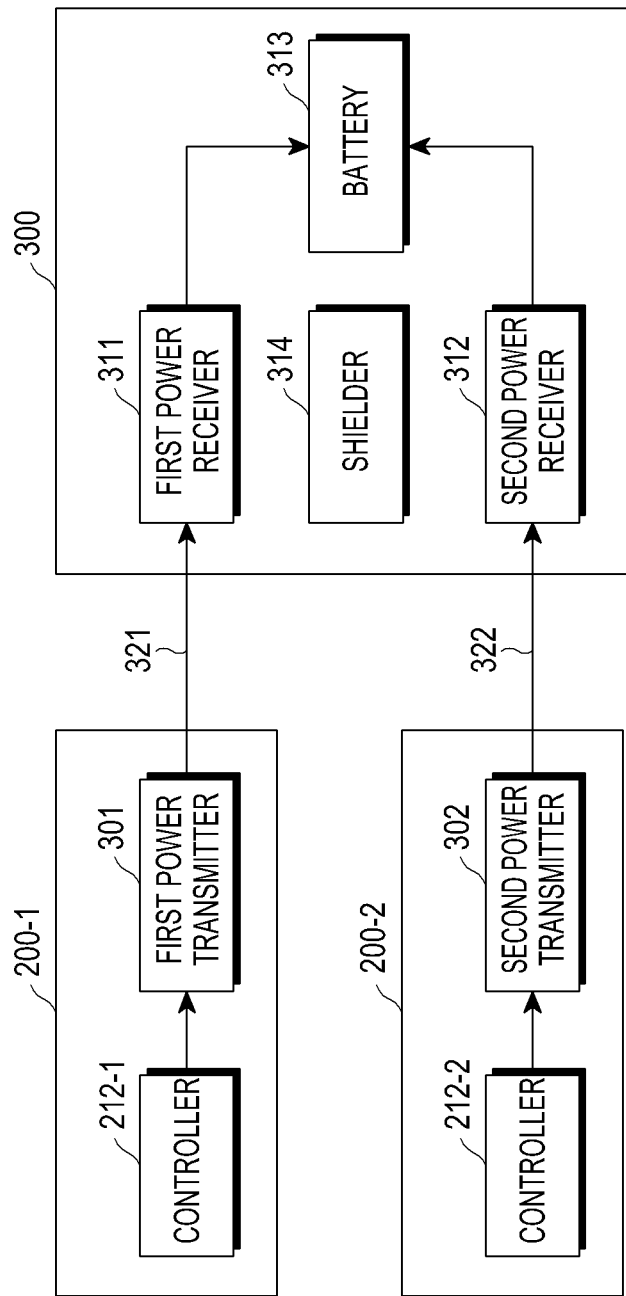

FIG. 3B is a block diagram illustrating a wireless power transmitter and a wireless power receiver according to an embodiment of the present disclosure.

An embodiment was described in FIG. 3A where the first power transmitter 301 and the second power transmitter 302 are included in one wireless power transmitter 200. In the embodiment shown in FIG. 3B, in contrast to the embodiment of FIG. 3A, the first power transmitter 301 may be included in a first wireless power transmitter 200-1, and the second power transmitter 302 may be included in a second wireless power transmitter 200-2. The controller 212-1 of the first wireless power transmitter 200-1 may control power applied to the first power transmitter 301, and the controller 212-2 of the second wireless power transmitter 200-2 may control power applied to the second power transmitter 302. In this case, the first wireless power transmitter 200-1 and the second wireless power transmitter 200-2 each may include a communication module (not shown), and each communication module may communicate with the communication module of the wireless power receiver 300. The wireless power receiver 300 may include one communication module. In another embodiment, the wireless power receiver 300 may include a plurality of communication modules that may respectively communicate with the first wireless power transmitter 200-1 and the second wireless power transmitter 200-2.

Figure 3C:
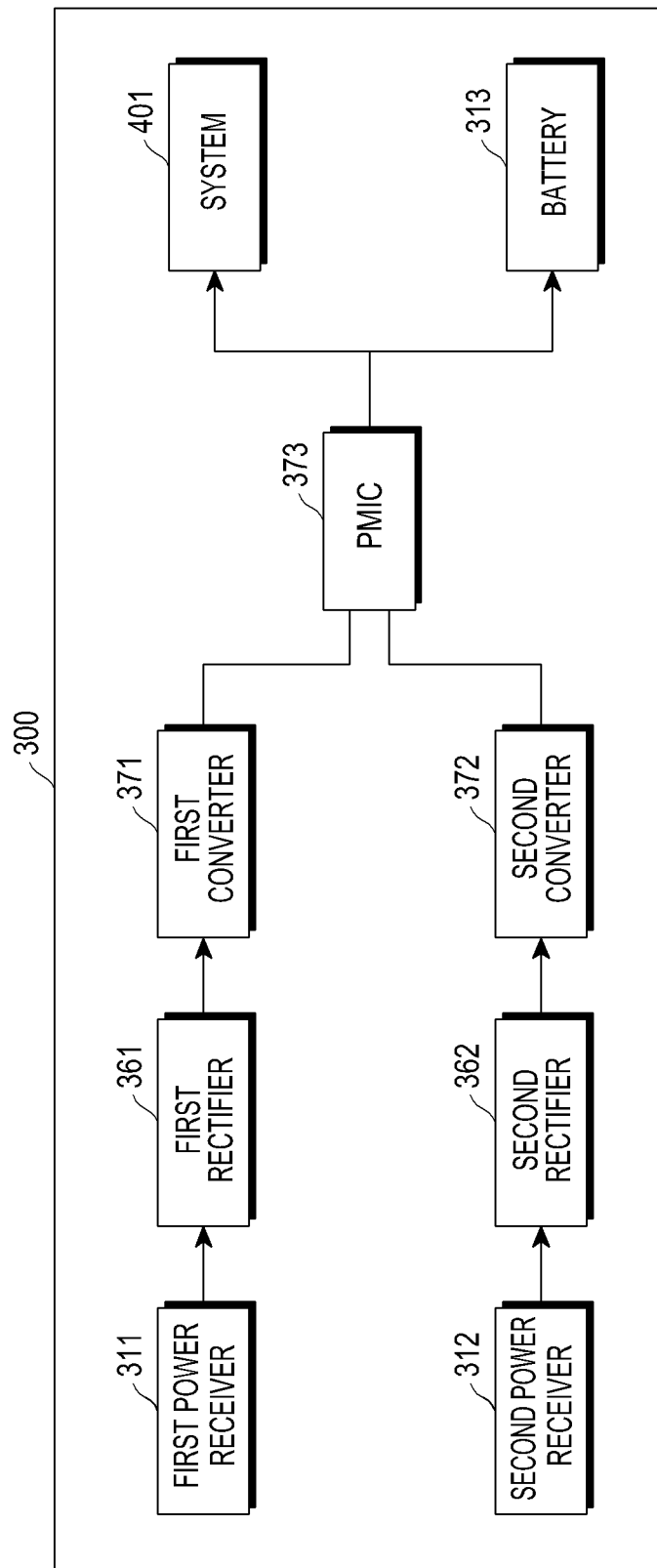

FIG. 3C is a block diagram illustrating a wireless power transmitter and a wireless power receiver according to an embodiment of the present disclosure.

Referring to FIG. 3C, the wireless power receiver 300 may include a first rectifier 361 connected to the first power receiver 311 and a second rectifier 362 connected to the second power receiver 312. The first rectifier 361 may rectify AC power received from the first power receiver 311 to DC power, and the second rectifier 362 may rectify AC power received from the second power receiver 312 to DC power. The first rectifier 361 and the second rectifier 362 each are not limited to a particular means as long as it may rectify AC power to DC power.

The wireless power receiver 300 may include a first converter 371 that may convert the rectified power output from the first rectifier 361 and a second converter 372 that may convert the rectified power output from the second rectifier 362. In an embodiment, the first converter 371 and the second converter 372 each may be implemented as a DC/DC converter that may convert the voltage of power from the rectifier to a voltage appropriate for the battery 313 and the system 401.

The wireless power receiver 300 may include a power management integrated chip (PMIC) 373 that is connected to the first converter 371 and the second converter 372 to receive the converted first power and the converted second power. According to an embodiment of the present disclosure, the PMIC 373 may output the converted first power and the converted second power to the battery 313, which may be embeddable or removable. Or, the PMIC 373 may output the converted first power and the converted second power to various systems 401 in the wireless power receiver 300. The PMIC 373 may perform overall management in the wireless power receiver 300, such as adjusting the amount of power output to the battery 313 and/or the system 401. For example, the PMIC 373 may include a regulating device (not shown) for adjusting the power outputted and a feedback circuit capable of obtaining various information such as voltage, current, and power from at least one of the system 401 and the battery 313.

As described above, according to an embodiment of the present disclosure, the wireless power receiver 300 may include a circuit for processing the first power from the first power transmitter 301 and a circuit for processing the second power from the second power transmitter 302 independently from each other. One power receiving path may comprise the first power receiver 311, the first rectifier 361, and the first converter 371, and the second power receiving path may comprise the second power receiver 312, the second rectifier 362, and the second converter 372.

Figure 3D:
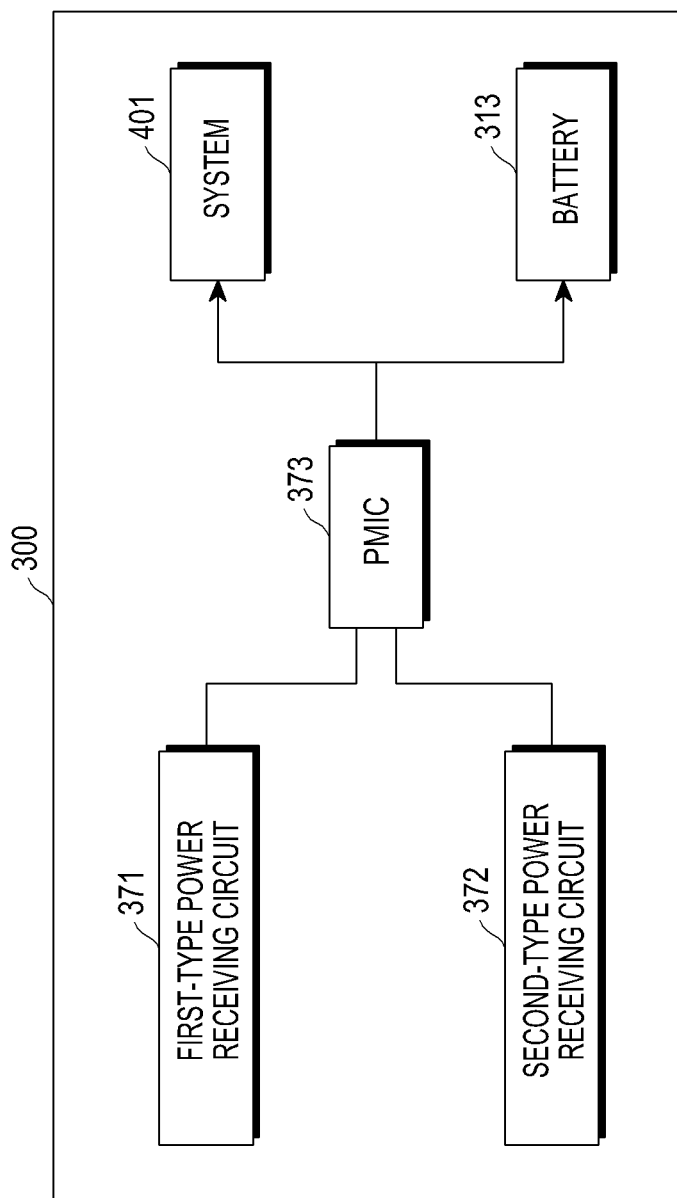

FIG. 3D is a block diagram illustrating a wireless power receiver according to an embodiment of the present disclosure.

Referring to FIG. 3D, according to an embodiment of the present disclosure, the wireless power receiver 300 may include a first-type power receiving circuit 376 and a second-type power receiving circuit 377.

The first-type power receiving circuit 376 may receive a first power based on a first type of power transmission method from the first power transmitter 301. The second-type power receiving circuit 377 may receive second power based on a second type of power transmission method from the second power transmitter 302. For example, the first-type power receiving circuit 376 may receive the first power based on the resonance method, and the second-type power receiving circuit 377 may receive the second power based on the inductive method. The first-type power receiving circuit 376 may include a device required in the first type, and the second-type power receiving circuit 377 may include a device required in the second type.

The PMIC 373 may output the first power processed by the first-type power receiving circuit 376 and the second power processed by the second-type power receiving circuit 377 to various systems 401 in the wireless power receiver 300. The PMIC 373 may perform overall management in the wireless power receiver 300, such as adjusting the amount of power output to the battery 313 and/or the system 401.

Figure 3E:
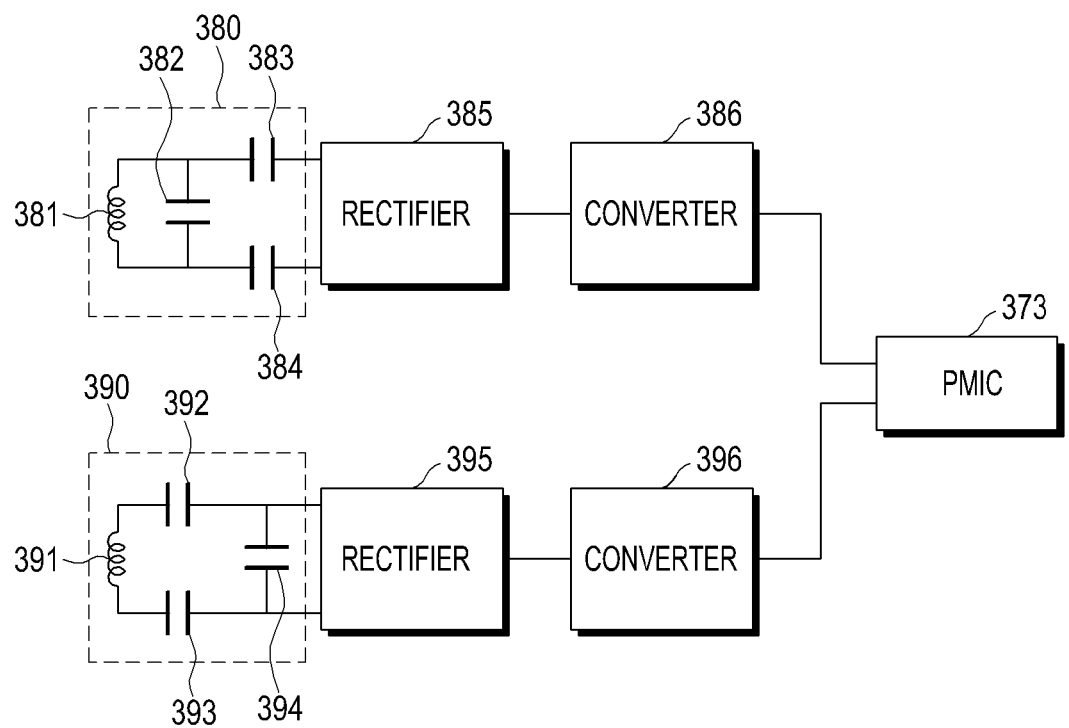
FIG. 3E is a view illustrating the circuit architecture of a wireless power receiver according to an embodiment of the present disclosure.

FIG. 3E is a view illustrating the circuit architecture of a wireless power receiver according to an embodiment of the present disclosure. In an exemplary embodiment shown in FIG. 3E, the power receiver may be implemented using, for example, the resonance method and inductive method.

Referring to FIG. 3E, the wireless power receiver 300 may include a resonance method power receiver 380 and an inductive method power receiver 390. The resonance method power receiver 380 may include a first coil 381 connected in parallel with a first capacitor 382. The resonance method power receiver 380 may further include a second capacitor 383 connected to the first ends of the first coil 381 and the first capacitor 382 and a third capacitor 384 connected to the second ends of the first coil 381 and the first capacitor 382. The first coil 381, the first capacitor 382, the second capacitor 383, and the third capacitor 384 may form a resonant circuit for receiving power in the resonance method, e.g., a resonant circuit having a resonant frequency of 6.78 MHz required in the A4WP specifications.

The wireless power receiver 300 may include a rectifier 385 to rectify the AC power from the resonance method power receiver 380 to DC power. The wireless power receiver 300 may further include a converter 386 that may convert the voltage of the DC power from the rectifier 385 to appropriate DC voltage(s). Accordingly, the rectifier 385 and the converter 386 may process the AC power received via the resonance method and output appropriate voltage(s) for the system 401 and/or the battery 313.

The inductive method power receiver 390 may include a fourth capacitor 392 and a fifth capacitor 393 connected in series with the second coil 391. The inductive method power receiver 390 may include a sixth capacitor 394 connected in parallel with the second coil 391, the fourth capacitor 392, and the fifth capacitor 393. An induced current may be generated in the second coil 391 from the transmitted by a power transmitter and may transfer the induced current to the rectifier 395. The rectifier 395 may rectify the induced current to DC and output DC power to the converter 396, and the converter 396 may convert the voltage of the DC power to appropriate DC voltage(s).

As described above, according to an embodiment of the present disclosure, the wireless power receiver 300 may perform quicker charging of the battery 313 by using a plurality of power receivers using different wireless charging schemes.

While various figures show a simple diagram where a power receiver provides power to the battery 313 for the sake of ease in explanation, as explained with respect to previous figures, a power receiver may provide power to the system 401 and/or the battery 313.

Figure 4A:
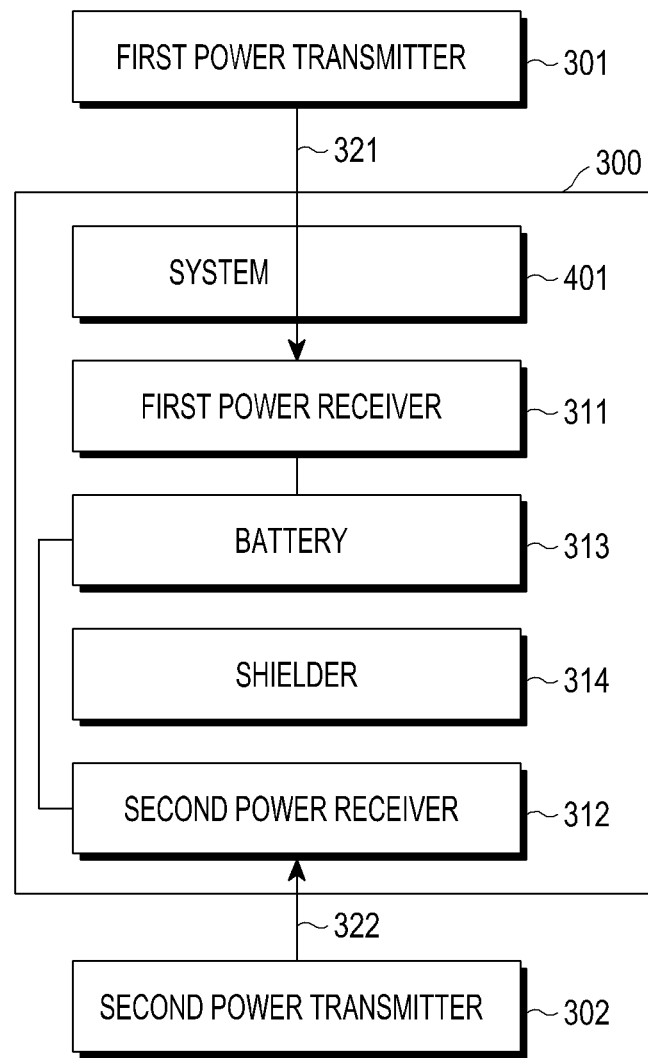
FIGS. 4A to 4C are side views illustrating wireless power receivers according to embodiments of the present disclosure.
Figure 4B:
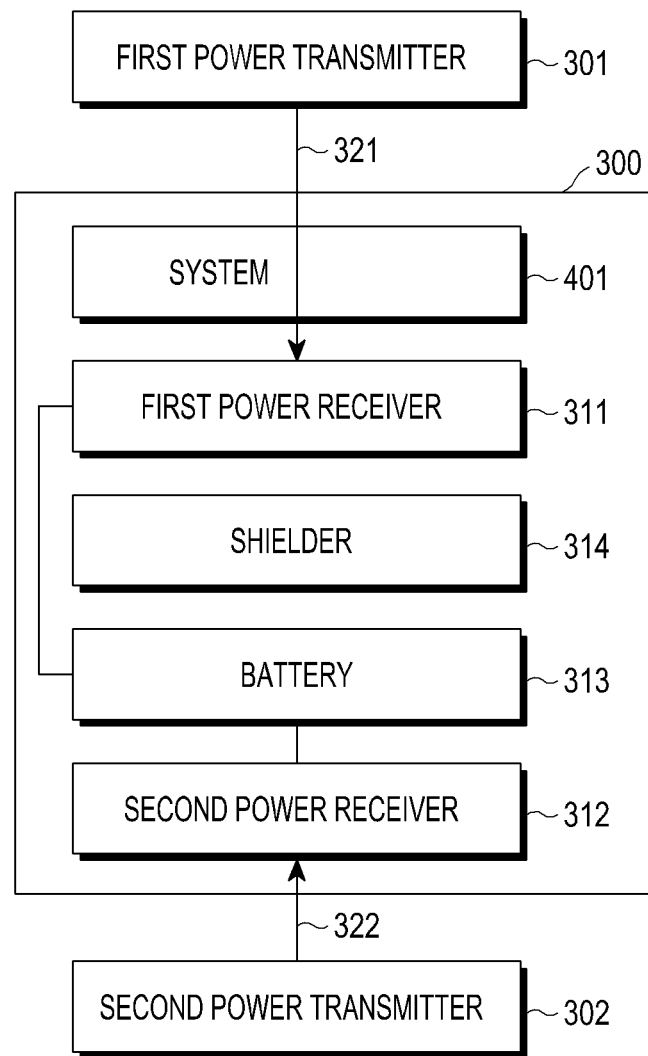
Figure 4C:
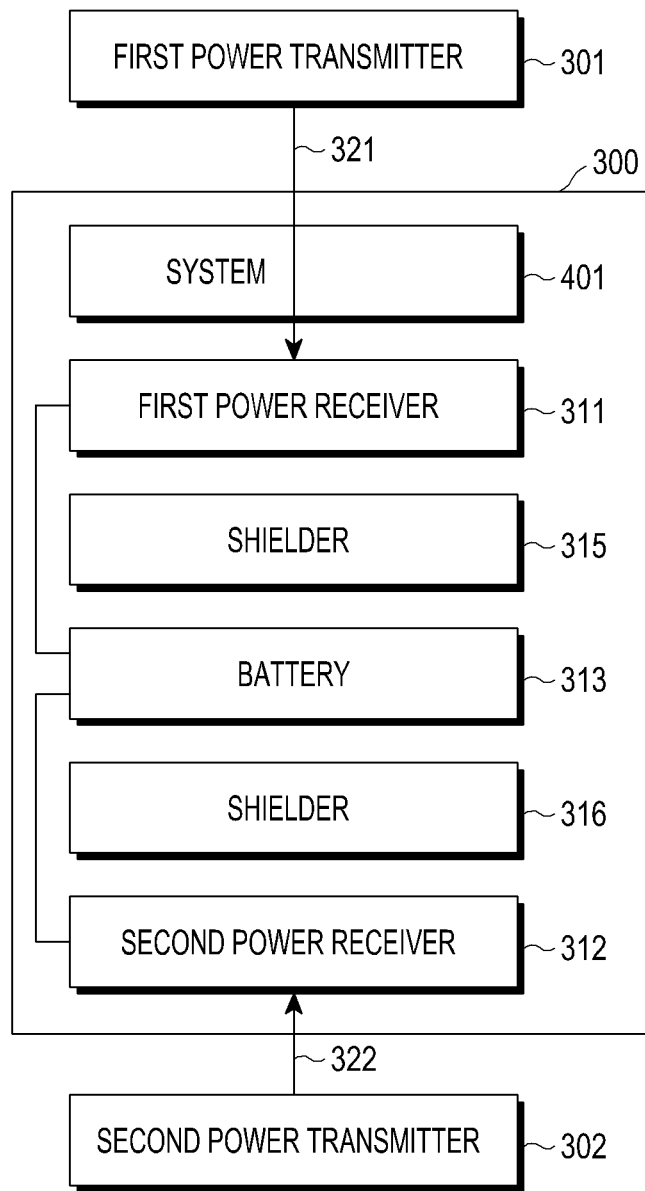

FIGS. 4A to 4C are side views illustrating wireless power receivers according to embodiments of the present disclosure. Referring to FIG. 4A, the second power receiver 312 may be disposed at the lowermost side of the wireless power receiver 300. The shielder 314 may be disposed over the second power receiver 312. The battery 313 may be disposed over the shielder 314. The first power receiver 311 may be disposed over the battery 313. The system 401 may be disposed over the first power receiver 311. The wireless power receiver 300 may be disposed over the second power transmitter 302. Accordingly, the second power receiver 312 disposed at the lowermost side of the wireless power receiver 300 may be positioned adjacent to the second power transmitter 302.

The second power receiver 312 may wirelessly receive second power 322 from the second power transmitter 302. The second power receiver 312 may process the received second power 322 and output DC power to the battery 313 and/or the system 401. The first power transmitter 301 may be disposed over the wireless power receiver 300.

The first power receiver 311 may receive first power 321 from the first power transmitter 301. In an embodiment, the system 401 may be formed of a material through which the first power 321 may be transmitted. Thus, the first power receiver 311 may receive the first power 321 from the first power transmitter 301. The shielder 314 may substantially shield the first power receiver 311 from the second power 322. Similarly, the shielder 314 may substantially shield the second power receiver 312 from the first power 321. It will be appreciated by one of ordinary skill in the art that any material that may substantially shield (or effectively block or redirect) the transmission of electric fields and/or magnetic fields or absorb electric fields and/or magnetic fields may be adopted for the shielder 314. The term "substantially shield" means to shield magnetic field or electric field such that magnitude of penetrated fields is below a preset threshold.

FIG. 4B is a side view illustrating a wireless power receiver according to an embodiment of the present disclosure. Referring to FIG. 4B, the second power receiver 312 may be disposed at the lowest side of the wireless power receiver 300. The battery 313 may be disposed over the second power receiver 312. The shielder 314 may be disposed over the battery 313. The first power receiver 311 may be disposed over the shielder 314. The system 401 may be disposed over the first power receiver 311. The wireless power receiver 300 may be disposed over the second power transmitter 302. Accordingly, the second power receiver 312 disposed at the lowermost side of the wireless power receiver 300 may be positioned adjacent to the second power transmitter 302.

The second power receiver 312 may wirelessly receive second power 322 from the second power transmitter 302. The second power receiver 312 may process the received second power 322 and output DC power to the battery 313 and/or the system 401. The first power transmitter 301 may be disposed over the wireless power receiver 300.

The first power receiver 311 may receive first power 321 from the first power transmitter 301. In an embodiment, the system 401 may be formed of a material through which the first power 321 may be transmitted, and, thus, the first power receiver 311 may receive the first power 321 from the first power transmitter 301.

The shielder 314 may substantially shield the first power receiver 311 from the second power 322. Similarly, the shielder 314 may substantially shield the second power receiver 312 from the first power 321. It will be appreciated by one of ordinary skill in the art that any material that may effectively block or redirect the transmission of electric fields and/or magnetic fields or absorb electric fields and/or magnetic fields may be adopted for the shielder 314.

FIG. 4C is a side view illustrating a wireless power receiver according to an embodiment of the present disclosure. Referring to FIG. 4C, the second power receiver 312 may be disposed at the lowest side of the wireless power receiver 300. The shielder 316 may be disposed over the second power receiver 312. The battery 313 may be disposed over the shielder 316. The shielder 315 may be disposed over the battery 313. The first power receiver 311 may be disposed over the shielder 315. The system 401 may be disposed over the first power receiver 311. The wireless power receiver 300 may be disposed over the second power transmitter 302. Accordingly, the second power receiver 312 disposed at the lowermost side of the wireless power receiver 300 may be positioned adjacent to the second power transmitter 302.

The second power receiver 312 may wirelessly receive second power 322 from the second power transmitter 302. The second power receiver 312 may process the received second power 322 and output DC power to the battery 313 and/or the system 401. The first power transmitter 301 may be disposed over the wireless power receiver 300.

The first power receiver 311 may receive first power 321 from the first power transmitter 301. In an embodiment, the system 401 may be formed of a material through which the first power 321 may be transmitted, and, thus, the first power receiver 311 may receive the first power 321 from the first power transmitter 301.

The shielders 315, 316 may substantially shield the second power receiver 312 from the first power 321. Similarly, the shielders 315, 316 may substantially shield the first power receiver 311 from the second power 322. It will be appreciated by one of ordinary skill in the art that any material that may effectively block/redirect the transmission of electric fields and/or magnetic fields or absorb electric fields and/or magnetic fields may be adopted for the shielder 314.

Figure 5A:
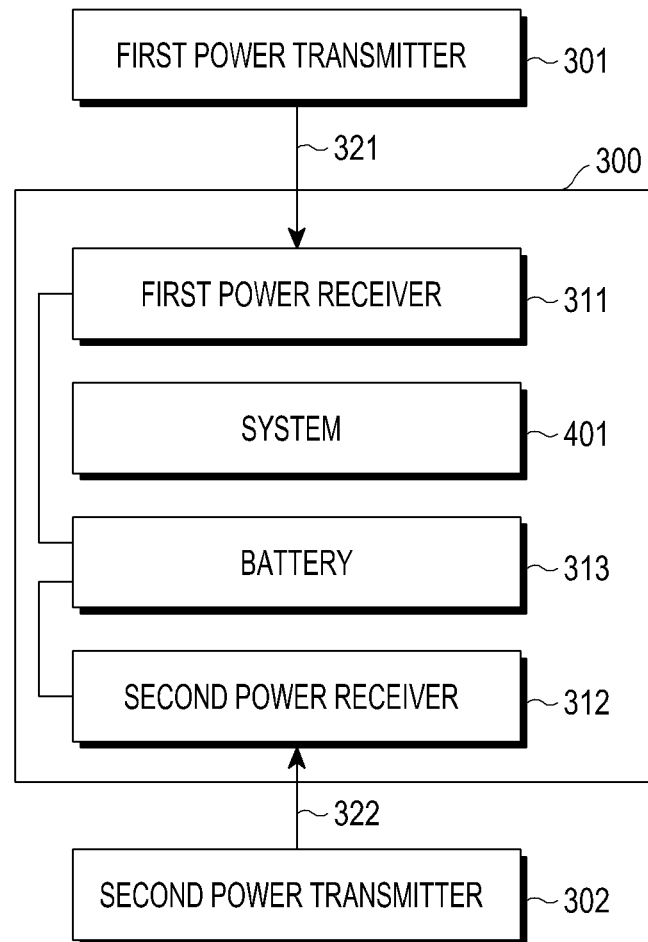
FIG. 5A is a side view illustrating a wireless power receiver according to an embodiment of the present disclosure.

FIG. 5A is a side view illustrating a wireless power receiver according to an embodiment of the present disclosure. Referring to FIG. 5A, the second power receiver 312 may be disposed at the lowest side of the wireless power receiver 300. The battery 313 may be disposed over the second power receiver 312. The system 401 may be disposed over the battery 313. The first power receiver 311 may be disposed over the system 401. The wireless power receiver 300 may be disposed over the second power transmitter 302. Accordingly, the second power receiver 312 disposed at the lowermost side of the wireless power receiver 300 may be positioned adjacent to the second power transmitter 302.

The second power receiver 312 may wirelessly receive second power 322 from the second power transmitter 302. The second power receiver 312 may process the received second power 322 and output DC power to the battery 313 and/or the system 401. The first power transmitter 301 may be disposed over the wireless power receiver 300.

The first power receiver 311 may receive first power 321 from the first power transmitter 301. In an embodiment, the system 401 may be formed of a material through which the first power 321 may be transmitted, and, thus, the first power receiver 311 may receive the first power 321 from the first power transmitter 301.

In an embodiment, the system 401 may be implemented as a display including a shielding film at its lower side. The shielding film may include material that may effectively block/redirect the transmission of electric fields and/or magnetic fields or absorb electric fields and/or magnetic fields, thereby cutting off the inflow of the first power 321 into the second power receiver 312 and the inflow of the second power 322 into the first power receiver 311. In an embodiment, the first power receiver 311 may be formed of a transparent material, e.g., indium-tin-oxide (ITO), allowing the user to view the display.

Figure 5B:
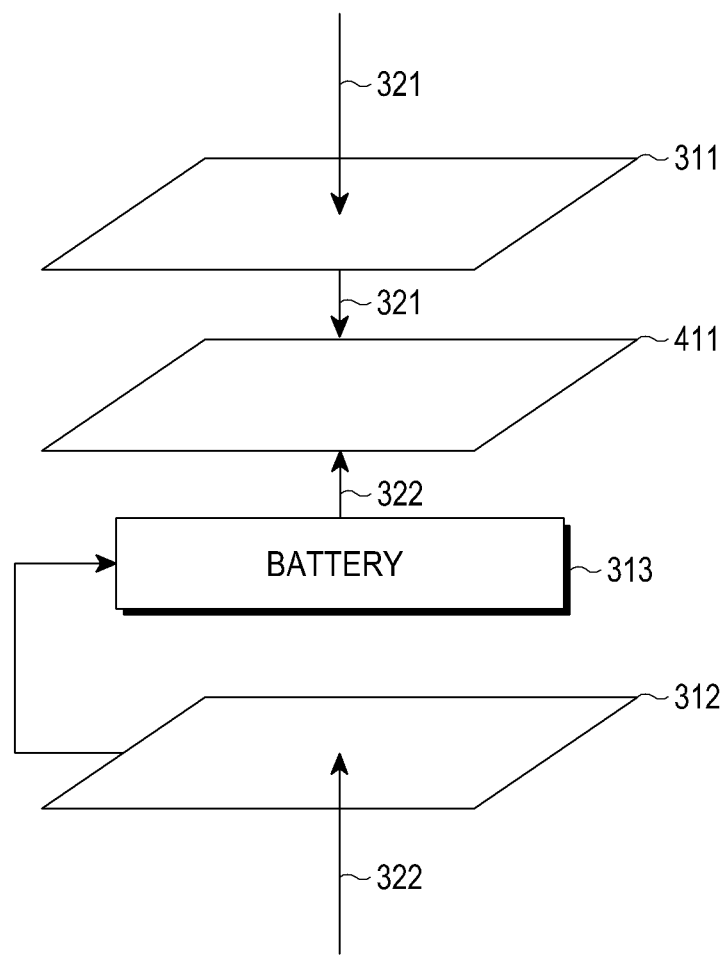
FIG. 5B is a view illustrating a wireless power receiver according to an embodiment of the present disclosure.

FIG. 5B is a view illustrating a wireless power receiver according to an embodiment of the present disclosure. Referring to FIG. 5B, the first power receiver 311 may be disposed over the display 411 having a shielding film at its lower side. As described above, the display may contain suitable material to prevent influx of the first power 321 into the second power receiver 312 and the influx of the second power 322 into the first power receiver 311.

Figure 5C:
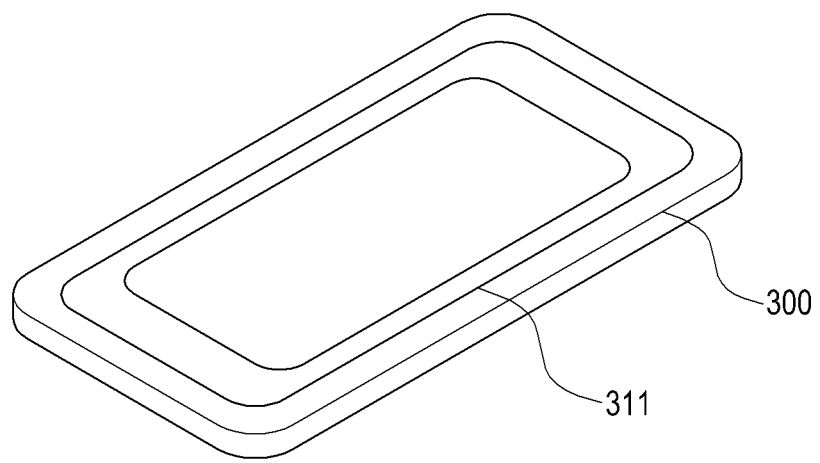
FIGS. 5C and 5D are views illustrating wireless power receivers according to embodiments of the present disclosure.

According to an embodiment of the present disclosure, the first power receiver 311 may be formed inside the bezel as shown in FIG. 5C. Being formed in bezel, the first power receiver 311 may not interfere with viewing information on the display 411.

Figure 5D:
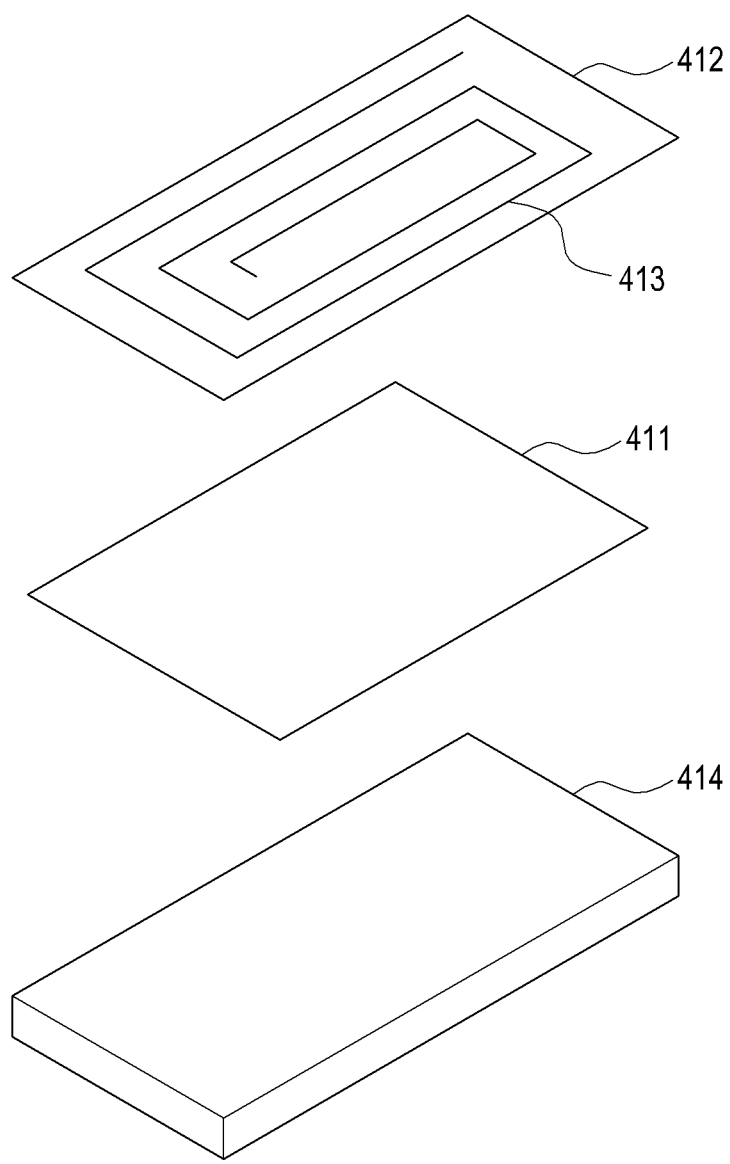

According to an embodiment of the present disclosure, as shown in FIG. 5D, a power receiver 413 may be disposed over a glass 412 that is placed at an upper side of the display 411. For example, a narrow pattern impossible to notice at naked eyes may be formed on the glass 412. A coil for receiving power may be disposed on the formed pattern, and, thus, the power receiver 413 may be disposed over the display 411.

The power receiver 413 may receive the first power from the first power transmitter, and electric fields and/or magnetic fields of the first power may be effectively blocked by the display 411 and thus prevented from providing power to the second power receiver.

Figure 6:
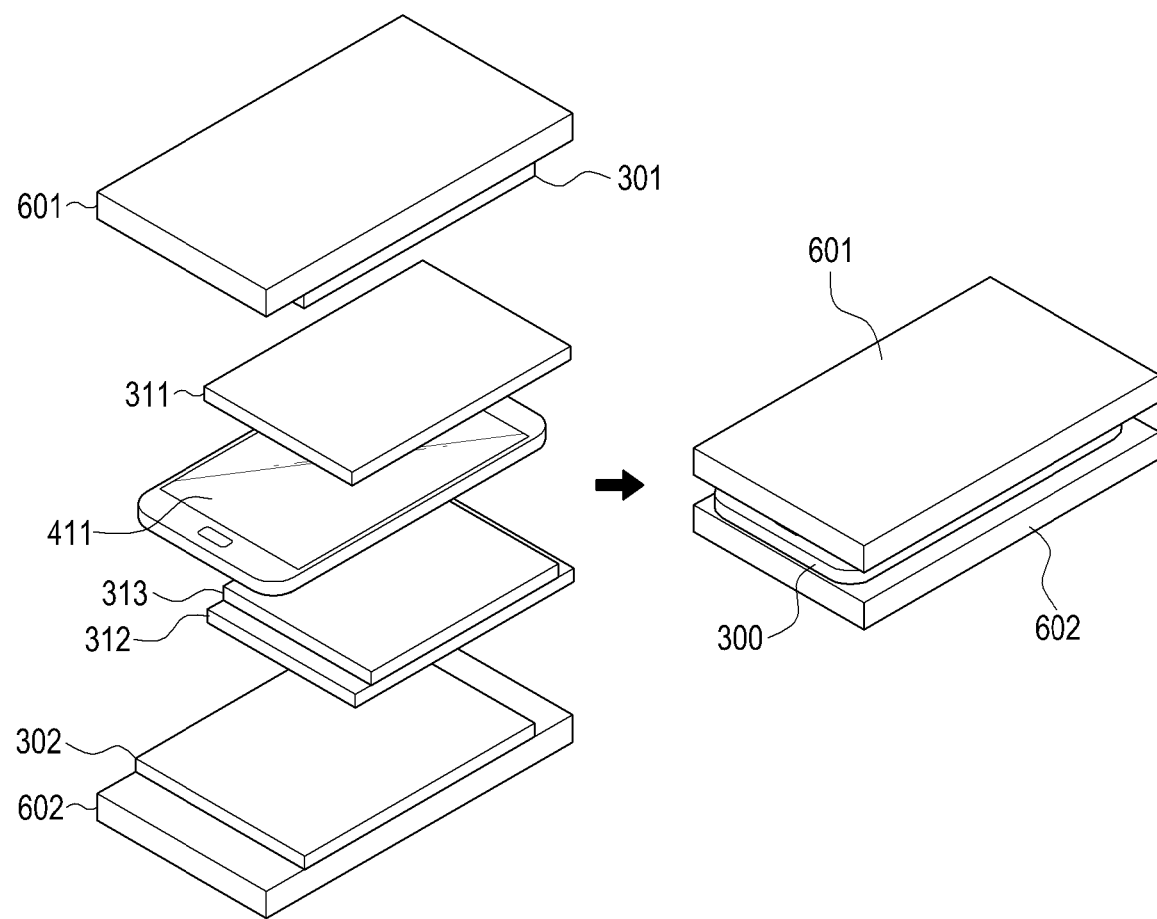
FIG. 6 is a view illustrating a wireless power transmitter and a wireless power receiver according to an embodiment of the present disclosure.

FIG. 6 is a view illustrating a wireless power transmitter and a wireless power receiver according to an embodiment of the present disclosure.

Referring to FIG. 6, the wireless power transmitter may include a first flat plate 601 and a second flat plate 602 spaced apart from the first flat plate 601 at a predetermined interval. The first flat plate 601 may include the first power transmitter 301, and the second flat plate 602 may include the second power transmitter 302. Although in FIG. 6 the first power transmitter 301 and the second power transmitter 302 respectively are disposed on the first flat plate 601 and the second flat plate 602, this is merely an example, and the position of the first power transmitter 301 and the second power transmitter 302 is not particularly limited.

The wireless power receiver 300 may include the first power receiver 311 and the second power receiver 312. The wireless power receiver 300 may further include the battery 313. As described above, the first power receiver 311 may be disposed over the display 411 of the wireless power receiver 300. Accordingly, electric fields and/or magnetic fields emitted from the first power transmitter 301 may be effectively blocked by the display 411 from the second power receiver 312. Thus, the first power from the first power transmitter 301 may be received by the first power receiver 311. The second power from the second power transmitter 302 may be effectively blocked by the display 411 from the first power receiver 311, and may be received by the second power receiver 312. Accordingly, any one of the first power receiver 311 or the second power receiver 312 may be prevented from being over-powered, and the battery 313 may simultaneously receive power from the first power receiver 311 and the second power receiver 312. Thus, quick charging may be achieved.

As shown in FIG. 6, the wireless power receiver 300 may be put in the space between the first flat plate 601 and the second flat plate 602. Thus, the first power transmitter 301 included in the first flat plate 601 may be positioned adjacent to the first power receiver 311 of the wireless power receiver 300, and the second power transmitter 302 included in the second flat plate 602 may be positioned adjacent to the second power receiver 312 of the wireless power receiver 300.

Figure 7:
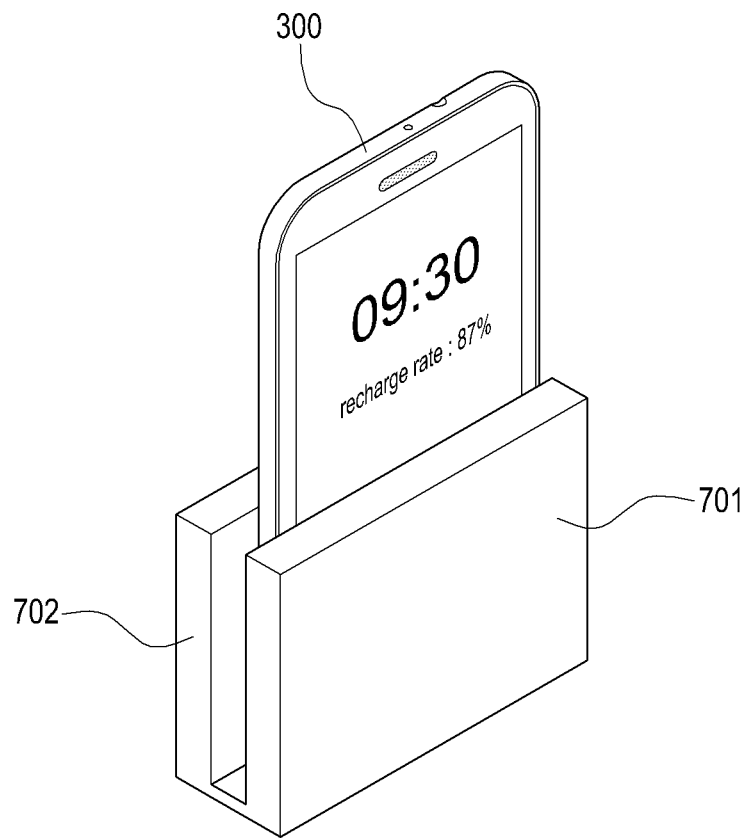
FIG. 7 is a view illustrating a wireless power transmitter and a wireless power receiver according to an embodiment of the present disclosure.

FIG. 7 is a view illustrating a wireless power transmitter and a wireless power receiver according to an embodiment of the present disclosure.

Referring to FIG. 7, the first flat plate 701 and the second flat plate 702 may be extended in upper and lower directions. The wireless power receiver 300 may be put in the space between the first flat plate 701 and the second flat plate 702 to be wirelessly charged. As shown in FIG. 7, the height of the first flat plate 701 and the second flat plate 702 may be set to be smaller than the height of the wireless power receiver 300. Thus, while the wireless power receiver 300 is being charged, a portion of the display may be exposed, and the user may notice information such as current time or charge rate displayed by the wireless power receiver 300.

Figure 8A:
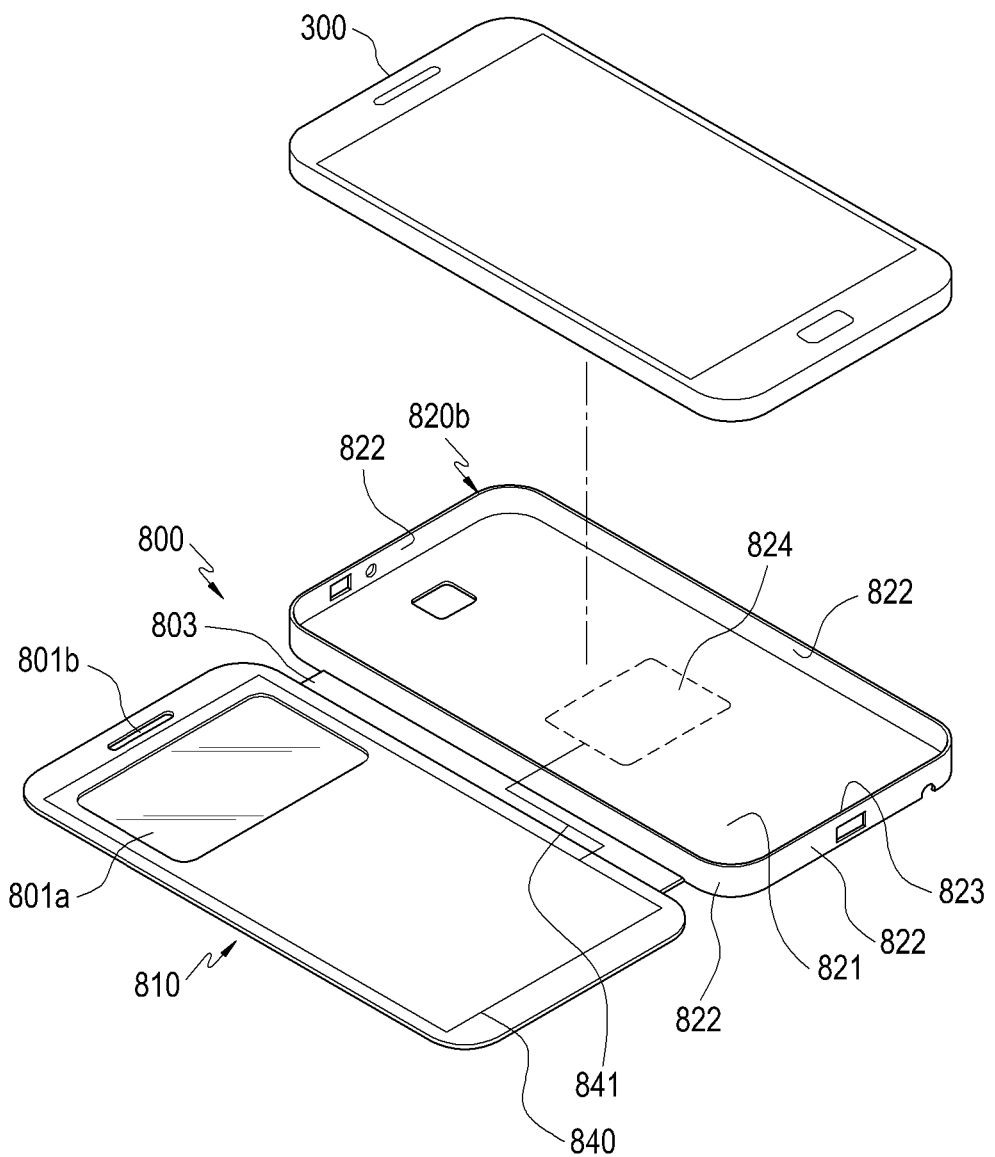
FIG. 8A is a view illustrating a wireless power receiver and a wireless power receiving module according to an embodiment of the present disclosure.

FIG. 8A is a view illustrating a wireless power receiver and a wireless power receiving module according to an embodiment of the present disclosure.

Referring to FIG. 8A, the wireless power receiving module may include a front cover 810, a connector 803, and a main body 820*b*. The wireless power receiver 300 may be firmly embedded in the main body 820*b*.

The main body 820*b* may include a bottom portion 821, at least one side wall 822 and a holder 823 formed along the edge of the bottom portion 821. The side wall 822 is formed substantially perpendicular to the bottom portion 821. The lower end of the side wall 822 is connected to the bottom portion 821, and the holder 823 is formed at the upper end of the side wall 822. The internal space formed by the bottom portion 821 and the side wall 822 is formed to have a size and shape corresponding to the size and shape of the wireless power receiver 300. If the wireless power receiver 300 is put in the internal space, the wireless power receiver 300 may be held in place by the holder 823.

The front cover 810 is connected to a side surface of the main body 820*b*. The connector 803 may join the main body 820*b* to the front cover 810. The connector 803 may be flexible enough to allow the main body 820*b* and the front cover 810 to open and close with respect to each other.

The front cover 810 may include a window area 801*a* for viewing a part of the screen of the wireless power receiver 300 and an opening 801*b* for output from the speaker of the wireless power receiver 300. The front cover 810 may include an additional power receiver 840. Although in FIG. 8A the additional power receiver 840 is implemented in the form of a coil, this is a mere example, and the additional power receiver 840 may be implemented as a resonant circuit including a capacitor in addition to the coil.

The additional power receiver 840 may be connected to an interface 824 for connection with the wireless power receiver 300 via a wire 841. The interface 824 may be implemented as a device for electrical connection between the additional power receiver 840 and the wireless power receiver 300. Accordingly, when the wireless power receiver 300 is put in the main body 820*b*, the additional power receiver 840 may be electrically connected to the wireless power receiver 300.

Figure 8B:
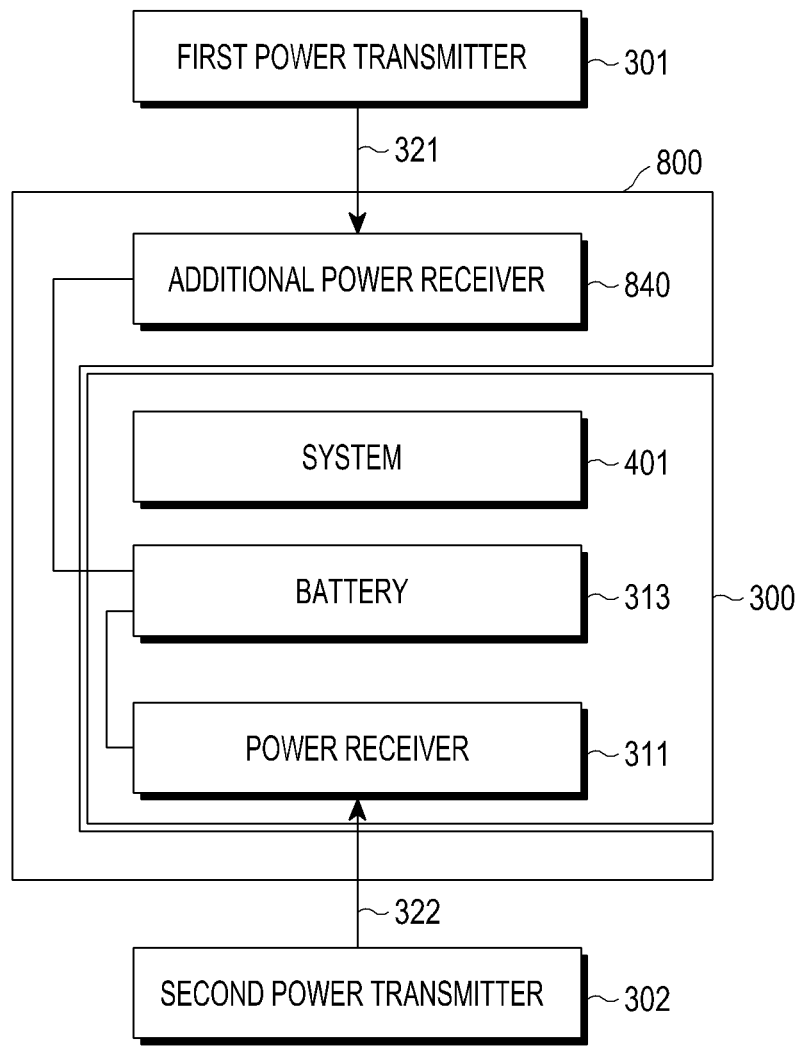
FIGS. 8B and 8C are side views illustrating examples in which the front cover is closed according to embodiments of the present disclosure.
Figure 8C:
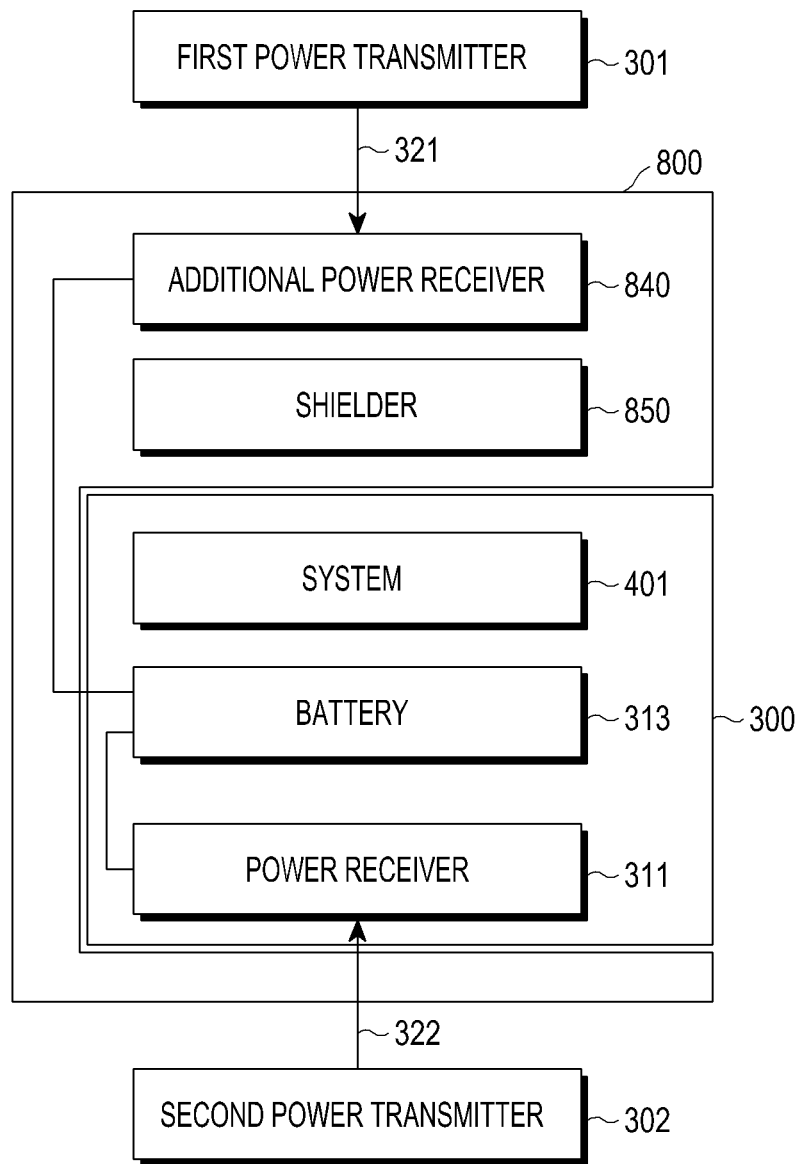

FIGS. 8B and 8C are side views illustrating examples in which the front cover is closed according to embodiments of the present disclosure.

Referring to FIG. 8B, the front cover of the wireless power receiving module may cover the front surface of the wireless power receiver 300. In this case, the additional power receiver 840 included in the front cover may be positioned adjacent to the first power transmitter 301. Furthermore, the additional power receiver 840 may be disposed over the system 401. In the embodiment of FIG. 8*b*, it is assumed that the system 401 includes a material that may effectively block electric fields and/or magnetic fields, like the previously described display 411.

The first power 321 from the first power transmitter 301 may be received by the additional power receiver 840 of the wireless power receiving module 800. The first power 321 may be effectively blocked by the system 401 and, thus, may be prevented from coming into the first power receiver 311 of the wireless power receiver 300. The first power 321 received by the additional power receiver 840 may be transferred to the battery 313 and/or the system 401 via the interface 824. According to an embodiment of the present disclosure, the wireless power receiving module 800 may include a device for wireless power processing such as a rectifier and/or a converter. In another embodiment, the wireless power receiver 300 may include a device for wireless power processing. In this case, the wireless power receiver 300 may include a device for wireless power processing for the first power receiver 311 independently of a device for wireless power processing for the wireless power receiving module 800.

The power receiver 311 may receive second power 322 from the second power transmitter 302. The second power 322 may be effectively blocked by the system 401 and may be thus prevented from introduction into the additional power receiver 840. In this case, the system 401 may include the display 411 as described above.

Referring to FIG. 8C, the front cover of the wireless power receiving module may cover the front surface of the wireless power receiver 300. In this case, the additional power receiver 840 included in the front cover may be positioned adjacent to the first power transmitter 301. Furthermore, the additional power receiver 840 may be disposed over the system 401. In the embodiment of FIG. 8C, it is assumed that the system 401 includes a material that may transmit electric fields and/or magnetic fields.

The first power 321 from the first power transmitter 301 may be received by the additional power receiver 840 of the wireless power receiving module 800. The wireless power receiving module 800 may include a shielder 850. The first power 321 may be effectively blocked by the shielder 850 and thus prevented from coming into the first power receiver 311 of the wireless power receiver 300. The first power 321 received by the additional power receiver 840 may be transferred to the battery 313 and/or the system 401 via the interface 824. According to an embodiment of the present disclosure, the wireless power receiving module 800 may include a device for wireless power processing such as a rectifier and/or a converter. In another embodiment, the wireless power receiver 300 may include a device for wireless power processing. In this case, the wireless power receiver 300 may include the device for wireless power processing for the first power receiver 311 independently of the device for wireless power processing for the wireless power receiving module 800.

The power receiver 311 may receive second power 322 from the second power transmitter 302. The second power 322 may be effectively blocked by the shielder 850 and may be prevented from introduction into the additional power receiver 840.

Figure 8D:
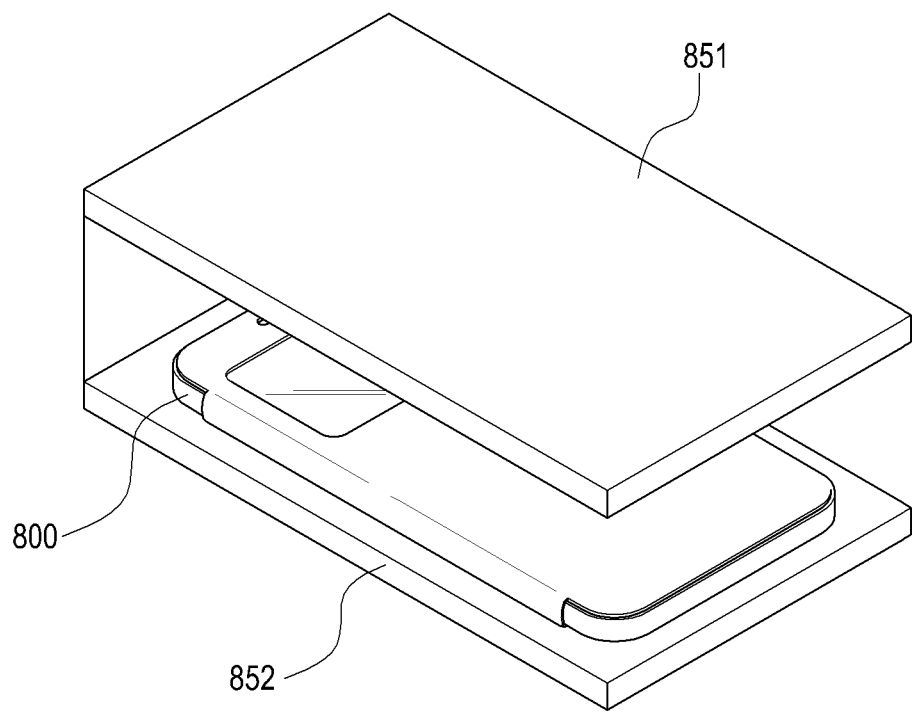
FIG. 8D is a view illustrating a wireless power transmitter and a wireless power receiver according to an embodiment of the present disclosure.

FIG. 8D is a view illustrating a wireless power transmitter and a wireless power receiver according to an embodiment of the present disclosure.

As shown in FIG. 8D, the wireless power transmitter may include a first flat plate 851 including the first power transmitter and a second flat plate 852 including the second power transmitter. The wireless power receiver 300, with a closed cover, may be put in the wireless power receiving module 800 in the space between the first flat plate 851 and the second flat plate 852. As described above, the additional power receiver 840 included in the cover may receive the first power from the first power transmitter and transfer the power to the wireless power receiver 300. Furthermore, the first power receiver 311 (FIGS. 5B, 5C & 6) of the wireless power receiver 300 may receive the second power 322 from the second power transmitter 302. The battery 313 may simultaneously receive power from the additional power receiver 840 and the first power receiver 311, enabling quicker charging. Furthermore, the first power receiver 311 may be prevented from being over-powered by a device such as the shielder 850 in the wireless power receiving module 800 or the shielder or display in the wireless power receiver 300.

Figure 9A:
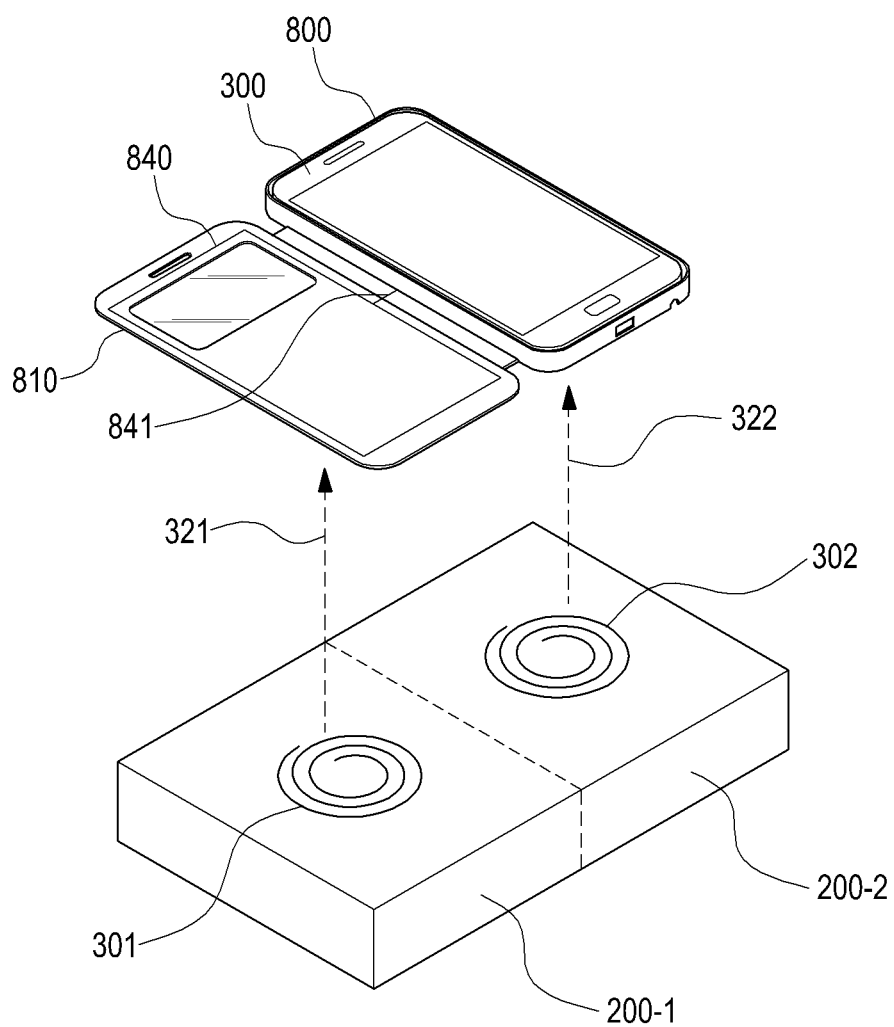
FIGS. 9A and 9B are views illustrating wireless charging according to an embodiment of the present disclosure.
Figure 9B:
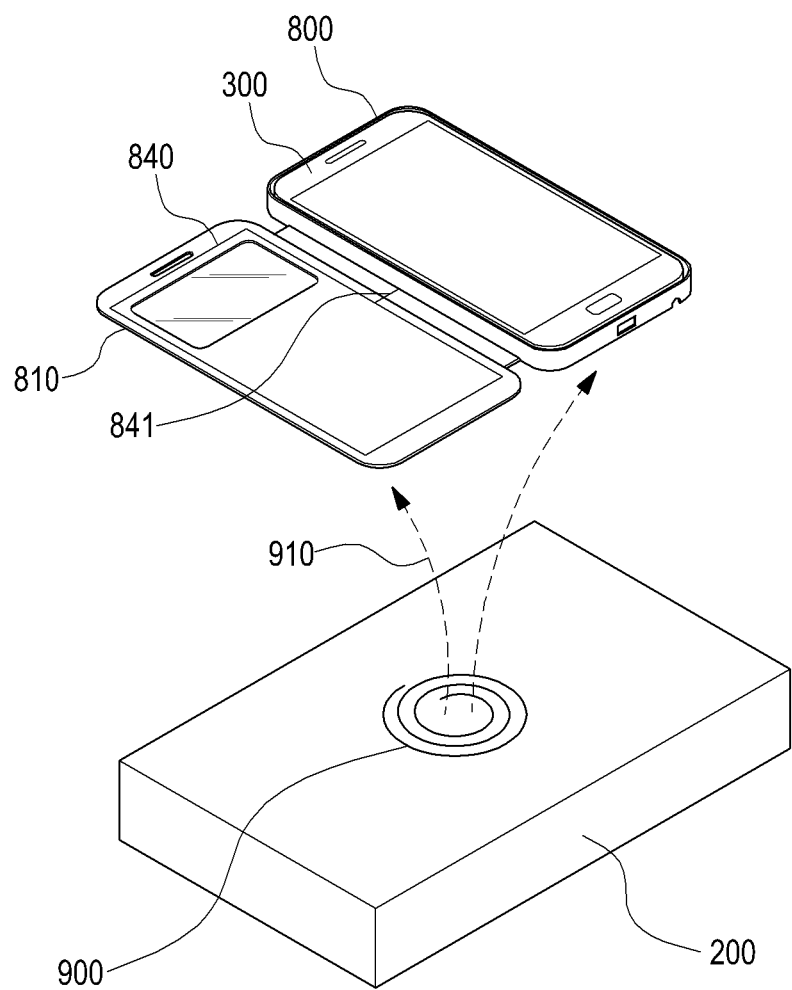

FIGS. 9A and 9B are views illustrating wireless charging according to an embodiment of the present disclosure.

Referring to FIG. 9A, the wireless power receiver 300 may be inserted and fastened in the wireless power receiving module 800. The front cover 810 of the wireless power receiving module 800 may be unfolded. In the embodiment of FIG. 9A, the first wireless power transmitter 200-1 may include the first power transmitter 301, and the second wireless power transmitter 200-2 may include the second power transmitter 302. According to an embodiment of the present disclosure, one wireless power transmitter may include both the first power transmitter 301 and the second power transmitter 302.

The additional power receiver 840 of the wireless power receiving module 800 may receive first power 321 from the first power transmitter 301, and the first power receiver 311 (FIGS. 5B, 5C & 6) of the wireless power receiver 300 may receive second power 322 from the second power transmitter 302. The first power transmitter 301 and the first power receiver 311 of the wireless power receiver 300 may be offset with respect to each other, and the second power transmitter 302 and the additional power receiver 840 may be offset with respect to each other. Accordingly, the first power 321 may be effectively introduced only into the additional power receiver 840, and the second power 322 may be effectively introduced only into the first power receiver 311 of the wireless power receiver 300. Thus, the battery 313 may simultaneously receive power from the additional power receiver 840 and the first power receiver 311, thereby enabling quicker charging. Furthermore, as the first power 321 may be effectively introduced only into the additional power receiver 840, and the second power 322 may be effectively introduced only into the first power receiver 311 of the wireless power receiver 300, any one of the additional power receiver 840 or the first power receiver 311 may be prevented from being over-powered.

As shown in FIG. 9B, the wireless power transmitter 200 may include one power transmitter 900, and the additional power receiver 840 and the first power receiver 311 (FIGS. 5B, 5C & 6) may receive power from the power transmitter 900.

Figure 10:
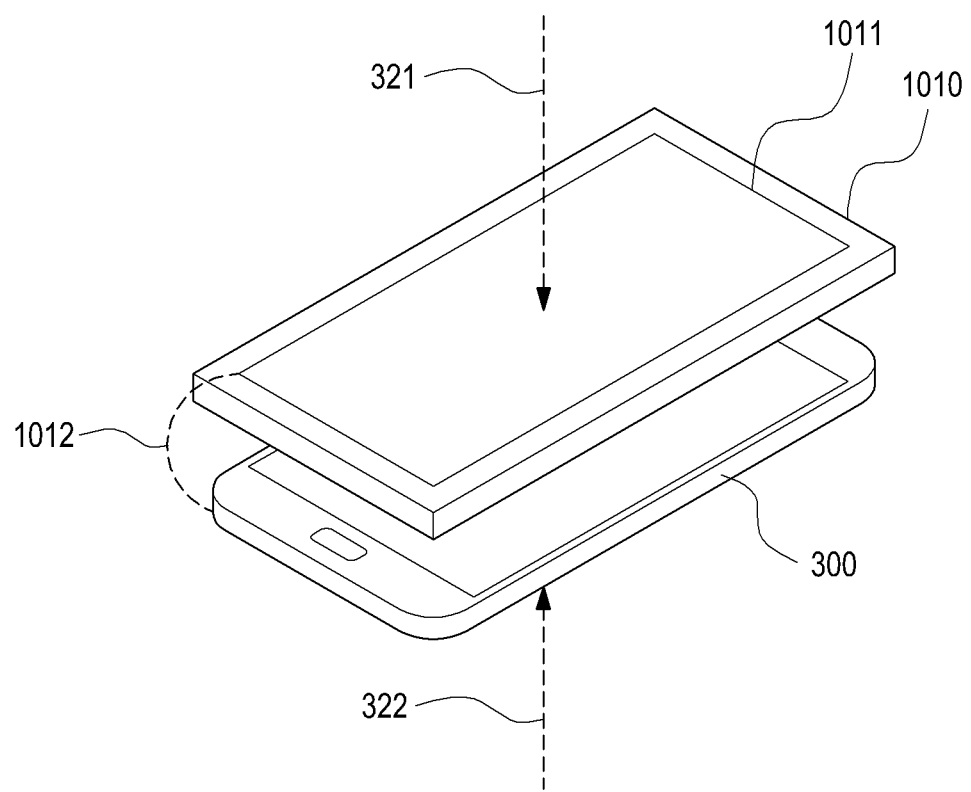
FIG. 10 is a view illustrating a wireless power receiving module according to an embodiment of the present disclosure.

FIG. 10 is a view illustrating a wireless power receiving module according to an embodiment of the present disclosure.

Referring to FIG. 10, according to an embodiment of the present disclosure, the wireless power receiving module 1010 may be implemented in the form of a detachable accessory, rather than a cover type. For example, the wireless power receiving module 1010 may include an interface 1012 for connecting to the additional power receiver 1011 and the wireless power receiver 300. According to an embodiment of the present disclosure, the additional power receiver 1011 may be electrically connected to the battery 313 of the wireless power receiver 300 via the interface 1012.

The user may connect the interface 1012 of the accessory-type wireless power receiving module 1010 to the wireless power receiver 300 when attempting quick charging. The additional power receiver 1011 may receive the first power 321 and transfer power to the wireless power receiver 300. The first power receiver 311 in the wireless power receiver 300 may receive the second power 322 and transfer power to the battery 313. Accordingly, the battery 313 may simultaneously receive power from the additional power receiver 1011 and the first power receiver 311, thereby enabling quicker charging. Furthermore, the display of the wireless power receiver 300 may shield the inflow of the first power 321 into the power receiver 311 and the inflow of the second power 322 into the additional power receiver 1011, thus preventing the first power receiver 311 of the wireless power receiver 300 from being over-powered.

Figure 11A:
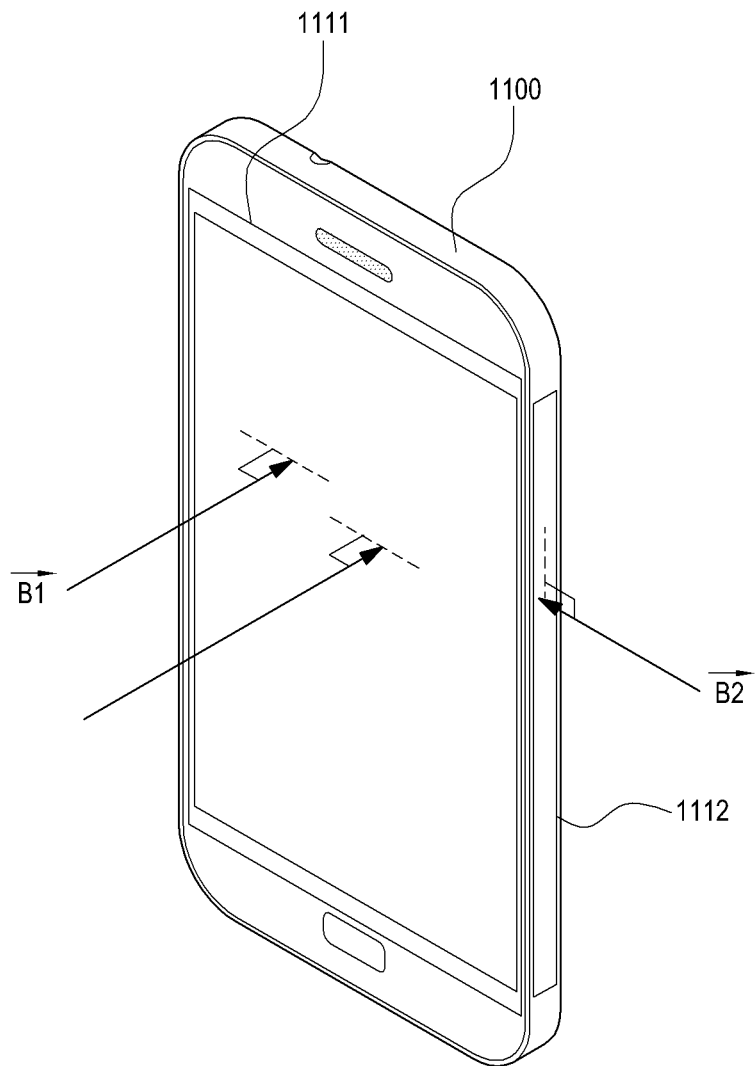
FIG. 11A is a view illustrating a wireless power receiver according to an embodiment of the present disclosure.

FIG. 11A is a view illustrating a wireless power receiver according to an embodiment of the present disclosure.

Referring to FIG. 11A, the wireless power receiver 1100 may include a first power receiver 1111 and a second power receiver 1112. According to an embodiment of the present disclosure, the first power receiver 1111 may be disposed to prevent inflow of the second power B2, and the second power receiver 1112 may be disposed to prevent inflow of the first power B1. For example, as shown in FIG. 11A, the first power B1 and the second power B2 may be generated by the wireless power transmitter in directions orthogonal to each other. Furthermore, the first power receiver 1111 and the second power receiver 1112 may be arranged in directions orthogonal with each other. When the direction that the coil is disposed is orthogonal with the direction of magnetic fields, maximum wireless charging efficiency may be achieved. When the direction that the coil is disposed is in the direction of the magnetic fields, the wireless charging efficiency may go to zero where wireless charging is impossible. In the embodiment of FIG. 11A, since the direction that the first power receiver 1111 is disposed is in the direction of the second power B2, the first power receiver 1111 may receive the first power B1, but not the second power B2. Furthermore, since the direction that the second power receiver 1112 is disposed is in the direction of the first power B1, the second power receiver 1112 may receive the second power B2, but not the first power B1. Thus, any one of the first power receiver 1111 and the second power receiver 1112 may be prevented from being over-powered.

Figure 11B:
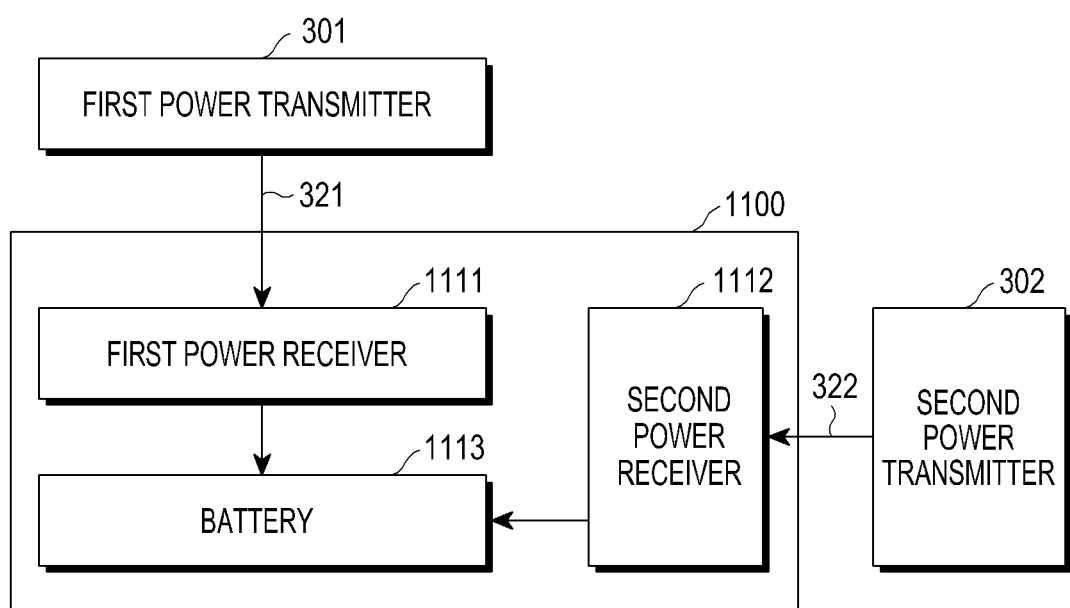
FIG. 11B is a block diagram illustrating a wireless power receiver according to an embodiment of the present disclosure.

FIG. 11B is a block diagram illustrating a wireless power receiver according to an embodiment of the present disclosure.

Referring to FIG. 11B, the wireless power receiver 1100 may include a first power receiver 1111 and a second power receiver 1112. The wireless power receiver 1100 may include a battery 1113. The battery 1113 may receive power from the first power receiver 1111 and the second power receiver 1112. As described above, the first power receiver 1111 and the second power receiver 1112 may receive power from the first power transmitter 301 and the second power transmitter 302, respectively, and transfer the received power to the battery 1113. The battery 1113 may receive power from the first power receiver 1111 and the second power receiver 1112, thereby enabling quick charging. As described above, the first power receiver 1111 may be disposed to prevent inflow of the second power B2, and the second power receiver 1112 may be disposed to prevent inflow of the first power B1. Thus, any one of the first power receiver 1111 and the second power receiver 1112 may be prevented from being over-powered while achieving quick charging.

According to an embodiment of the present disclosure, the wireless power receiver 1100 may further include a first rectifier (not shown) connected to the first power receiver 1111 to rectify the first power, a first converter (not shown) converting the rectified first power outputted from the first rectifier, a second rectifier (not shown) connected to the second power receiver 1112 to rectify the second power, and a second converter (not shown) converting the rectified second power outputted from the second rectifier.

According to an embodiment of the present disclosure, the wireless power receiver 1100 may further include a power management integrated chip (PMIC) (not shown) that is connected to the first converter and the second converter to receive converted first power and converted second power, respectively. The PMIC may output the converted first power and the converted second power to the battery 1113, which may be embeddable or removable, in the wireless power receiver.

The first power receiver 1111 and the second power receiver 1112 may receive the first power and the second power based on the same or different charging schemes.

Figure 11C:
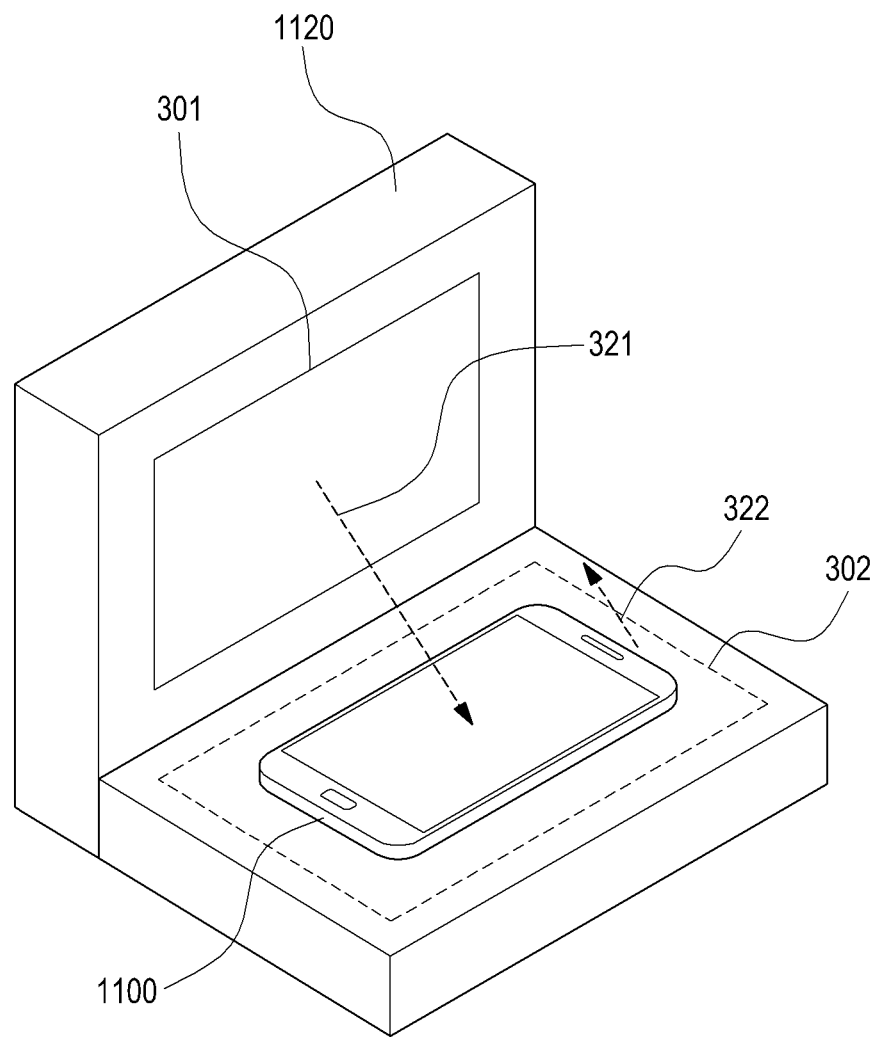
FIG. 11C is a view illustrating a wireless power transmitter according to an embodiment of the present disclosure.

FIG. 11C is a view illustrating a wireless power transmitter according to an embodiment of the present disclosure.

Referring to FIG. 11C, the wireless power receiver 1120 may include a first power transmitter 301 and a second power transmitter 302 arranged to be orthogonal to each other. As the first power transmitter 301 and the second power transmitter 302 are arranged in orthogonal directions with respect to each other, the first power 321 from the first power transmitter 301 and the second power 322 from the second power transmitter 302 may be orthogonal in direction with each other. Accordingly, each of the plurality of power receivers orthogonal to each other in the wireless power receiver 300 may receive one of the first power 321 and the second power 322.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components.

The term "unit" herein may refer to a unit including one of hardware, software, and firmware, or a combination thereof. The term "unit" may be interchangeably used with a module, logic, logical block, component, or circuit. The unit may be a minimum unit or part of an integrated component. The "unit" may be a minimum unit or part of a larger unit. The unit may be implemented mechanically or electronically. For example, a unit may be at least one of Application Specific Integrated Circuit (ASIC) chips, Field Programmable Gate Arrays (FPGAs), or Programmable Logic Arrays (PLAs), or other similar devices developed in the future.

Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, simultaneously, repeatedly, or heuristically. Furthermore, some of the operations may be performed in a different order, or omitted, or include other additional operation(s).

As is apparent from the foregoing description, the wireless power receiver includes a plurality of power receivers, thereby enabling quick charging and resultant time savings. A plurality of power receivers are provided, allowing power wirelessly received to be allocated to each of the plurality of power receivers. Thus, any one of the plurality of power receivers may be prevented from being over-powered and heated up.

The embodiments disclosed herein are proposed for description and understanding of the disclosed technology and does not limit the scope of the present disclosure. Accordingly, the scope of the present disclosure should be interpreted as including all changes or various embodiments based on the technical spirit of the present disclosure.

What is claimed is:

1. A wireless power receiver comprising:
   a first power receiver configured to wirelessly receive first power from a first power transmitter;
   a second power receiver configured to wirelessly receive second power from a second power transmitter; and
   a shielder disposed between the first power receiver and the second power receiver to substantially shield influx of the first power to the second power receiver and substantially shield influx of the second power to the first power receiver.

2. The wireless power receiver of claim 1, further comprising:
   a first rectifier configured to rectify the first power received by the first power receiver, and output rectified first power;
   a first converter configured to convert the rectified first power, and output converted first power;
   a second rectifier configured to rectify the second power received by the second power receiver, and output a rectified second power; and
   a second converter configured to convert the rectified second power, and output converted second power.

3. The wireless power receiver of claim 2, further comprising a power management integrated chip (PMIC) configured to receive the converted first power and the converted second power.

4. The wireless power receiver of claim 3, wherein the PMIC is configured to output the converted first power and the converted second power to a battery, wherein the battery is included in the wireless power receiver as one of an embedded battery and a removable battery.

5. The wireless power receiver of claim 1, wherein the first power receiver and the second power receiver receive the first power and the second power, respectively, based on the same wireless charging scheme.

6. The wireless power receiver of claim 1, wherein the first power receiver and the second power receiver receive the first power and the second power, respectively, based on different wireless charging schemes.

7. The wireless power receiver of claim 1, wherein the shielder is a part of a display of an electronic device.

8. The wireless power receiver of claim 1, wherein the shielder is disposed over the second power receiver, and the first power receiver is disposed over the shielder.

9. A wireless power receiving module detachably provided to a wireless power receiver, the wireless power receiving module comprising:
- a first power receiver configured to wirelessly receive first power;
- an interface configured to provide the received first power to the wireless power receiver, wherein the wireless power receiver is configured to wirelessly receive second power via a second power receiver; and
- a shielder, disposed between the first power receiver and the wireless power receiver, configured to substantially shield influx of the first power to the wireless power receiver, and substantially shield influx of the second power to the first power receiver.

10. The wireless power receiving module of claim 9, further comprising:
- a rectifier configured to rectify the first power to output a rectified first power; and
- a converter configured to convert the rectified first power to output a converted first power.

11. The wireless power receiving module of claim 9, further comprising:
- a main body configured to accept the wireless power receiver, wherein a rear surface of the wireless power receiver faces a bottom of the main body; and
- a cover attached to the main body, and configured to close to cover a front surface of the wireless power receiver and to open to expose the front surface of the wireless power receiver.

12. The wireless power receiving module of claim 11, wherein the cover comprises the first power receiver, and when the cover covers the front surface of the wireless power receiver, the first power receiver and the second power receiver of the wireless power receiver are isolated from each other by a display of the wireless power receiver.

* * * * *